(12) United States Patent
Chen et al.

(10) Patent No.: US 12,495,154 B2
(45) Date of Patent: Dec. 9, 2025

(54) DEVICE AND METHOD FOR DECODING VIDEO DATA

(71) Applicant: SHARP KABUSHIKI KAISHA, Sakai (JP)

(72) Inventors: Chih-Yuan Chen, Taipei (TW); Yu-Chiao Yang, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/884,758

(22) Filed: Sep. 13, 2024

(65) Prior Publication Data
US 2025/0097444 A1   Mar. 20, 2025

Related U.S. Application Data

(60) Provisional application No. 63/582,969, filed on Sep. 15, 2023.

(51) Int. Cl.
*H04N 19/44*   (2014.01)
*H04N 19/105*   (2014.01)
*H04N 19/117*   (2014.01)
*H04N 19/176*   (2014.01)
*H04N 19/80*   (2014.01)

(52) U.S. Cl.
CPC ......... *H04N 19/44* (2014.11); *H04N 19/105* (2014.11); *H04N 19/117* (2014.11); *H04N 19/176* (2014.11); *H04N 19/80* (2014.11)

(58) Field of Classification Search
CPC .... H04N 19/44; H04N 19/105; H04N 19/117; H04N 19/176; H04N 19/80
See application file for complete search history.

(56) References Cited

U.S. PATENT DOCUMENTS

| | | | |
|---|---|---|---|
| 2013/0215960 A1* | 8/2013 | Song | H04N 19/176 375/240.03 |
| 2024/0357091 A1* | 10/2024 | Zhao | H04N 19/18 |

FOREIGN PATENT DOCUMENTS

WO   WO-2025060115 A1 *   3/2025   ........... H04N 19/132

OTHER PUBLICATIONS

JVET-AD0081 (Year: 2023).*
JVET-AE0076 (Year: 2023).*
(Continued)

*Primary Examiner* — Shadan E Haghani
(74) *Attorney, Agent, or Firm* — ScienBiziP, P.C.

(57) ABSTRACT

A method of decoding video data performed by an electronic device is provided. The method receives the video data and determines a block unit from a current frame included in the video data. The method determines an extrapolation merge list of the block unit. The extrapolation merge list includes multiple extrapolation merge candidates. The method selects an extrapolation reference candidate from the extrapolation merge candidates for the block unit. Each of the extrapolation merge candidates includes multiple previous extrapolation parameters used to reconstruct a corresponding one of multiple extrapolation-reconstructed blocks. The extrapolation reference candidate is one of the extrapolation merge candidates. The method then determines an extrapolation prediction filter of the block unit based on the extrapolation reference candidate, and reconstructs the block unit based on the extrapolation prediction filter.

20 Claims, 8 Drawing Sheets

(56) References Cited

OTHER PUBLICATIONS

JVET-AF0080 (Year: 2023).*
Series H: Audiovisual and Multimedia Systems Infrastructure of audiovisual services—Coding of moving video, Versatile video coding, ITU-T H.266 (Apr. 2022).
Muhammed Coban et al., "Algorithm description of Enhanced Compression Model 9 (ECM 9)", JVET-AD2025, Joint Video Experts Team (JVET) of ITU-T SG 16 WP 3 and ISO/IEC JTC 1/SC 29, 30th Meeting, Antalya, TR, Apr. 21-28, 2023.
Adrian Browne et al., "Algorithm description for Versatile Video Coding and Test Model 20 (VTM20)", JVET-AD2002-v1, Joint Video Experts Team (JVET) of ITU-T SG 16 WP 3 and ISO/IEC JTC 1/SC 29, 30th Meeting, Antalya, TR, Apr. 21-28, 2023.

* cited by examiner

DEVICE AND METHOD FOR DECODING VIDEO DATA

CROSS-REFERENCE TO RELATED APPLICATION(S)

The present disclosure claims the benefit of and priority to U.S. Provisional Patent Application Ser. No. 63/582,969, filed on Sep. 15, 2023, entitled "On Filter Based Prediction Improvements," the content of which is hereby incorporated herein fully by reference in its entirety for all purposes.

FIELD

The present disclosure generally relates to video coding, and more specifically, to techniques for predicting and/or reconstructing a block unit using multiple extrapolation merge candidates, each including multiple previous extrapolation parameters used to reconstruct a corresponding one of multiple extrapolation-reconstructed blocks.

BACKGROUND

Extrapolation filter-based intra prediction (EIP) mode is a coding tool for video coding, in which, an encoder and/or a decoder may predict each of multiple block samples in a current block by using an extrapolation filter based on multiple reconstructed neighboring samples associated with a corresponding one of the block samples. In addition, the encoder and/or the decoder may derive the extrapolation filter of the current block based on multiple extrapolation neighboring samples in an extrapolation neighboring area reconstructed prior to the reconstruction of the current block. However, different area types of the extrapolation neighboring area and different shape types of the extrapolation filter may generate different filter coefficients of the extrapolation filter. Thus, the derivation process of the filter coefficients of the extrapolation filter may be complex and time-consuming.

Therefore, an efficient derivation mechanism for the extrapolation filter may be required for the encoder and/or the decoder to be able to precisely and efficiently predict and/or reconstruct the current block.

SUMMARY

The present disclosure is directed to a device and method for predicting and/or reconstructing a block unit using multiple extrapolation merge candidates, each including multiple previous extrapolation parameters used to reconstruct a corresponding one of multiple extrapolation-reconstructed blocks.

In a first aspect of the present disclosure, a method of decoding video data and an electronic device for performing the method are provided. The method includes receiving the video data; determining a block unit from a current frame included in the video data; determining an extrapolation merge list of the block unit, the extrapolation merge list including multiple extrapolation merge candidates, where each of the multiple extrapolation merge candidates includes multiple previous extrapolation parameters used to reconstruct a corresponding one of multiple extrapolation-reconstructed blocks; selecting an extrapolation reference candidate from the multiple extrapolation merge candidates for the block unit, where the extrapolation reference candidate is one of the multiple extrapolation merge candidates; determining an extrapolation prediction filter of the block unit based on the extrapolation reference candidate; and reconstructing the block unit based on the extrapolation prediction filter.

In an implementation of the first aspect of the present disclosure, each of the multiple extrapolation merge candidates of the block unit corresponds to one of multiple extrapolation candidate filters, and determining the extrapolation prediction filter of the block unit is further based on an extrapolation reference filter that is determined from the multiple extrapolation candidate filters and that corresponds to the extrapolation reference candidate.

In another implementation of the first aspect of the present disclosure, a specific one of the multiple extrapolation-reconstructed blocks corresponding to the extrapolation reference candidate is reconstructed using the extrapolation reference filter.

In another implementation of the first aspect of the present disclosure, the extrapolation prediction filter of the block unit is identical to the extrapolation reference filter when the block unit directly inherits the extrapolation reference filter.

In another implementation of the first aspect of the present disclosure, the method further includes determining multiple extrapolation reference parameters of the extrapolation reference candidate from the multiple previous extrapolation parameters, where: the extrapolation reference candidate corresponds to an extrapolation reference filter, and the multiple extrapolation reference parameters includes an extrapolation reference filter shape of the extrapolation reference filter.

In another implementation of the first aspect of the present disclosure, the multiple extrapolation reference parameters further include multiple extrapolation reference coefficients of the extrapolation reference filter, and determining the extrapolation prediction filter of the block unit is further based on the extrapolation reference filter shape and the multiple extrapolation reference coefficients of the extrapolation reference filter.

In another implementation of the first aspect of the present disclosure, the multiple extrapolation reference parameters further include an extrapolation reference area type of the extrapolation reference candidate, and determining the extrapolation prediction filter of the block unit is further based on the extrapolation reference area type of the extrapolation reference candidate and the extrapolation reference filter shape of the extrapolation reference filter when the block unit inherits the extrapolation reference area type of the extrapolation reference candidate.

In another implementation of the first aspect of the present disclosure, the method further includes determining an extrapolation neighboring area of the block unit neighboring the block unit based on the extrapolation reference area type of the extrapolation reference candidate; and deriving multiple extrapolation prediction coefficients of the extrapolation prediction filter based on the extrapolation reference filter shape of the extrapolation reference filter and the extrapolation neighboring area of the block unit.

In another implementation of the first aspect of the present disclosure, a shape of the extrapolation neighboring area of the block unit is identical to a shape of an extrapolation reference area of a specific one of the multiple extrapolation-reconstructed blocks corresponding to the extrapolation reference candidate, the extrapolation reference area determined based on the extrapolation reference area type of the extrapolation reference candidate, and a size of the extrapolation neighboring area of the block unit is proportional to a size of the extrapolation reference area based on a size relationship between the block unit and the specific one of the multiple extrapolation-reconstructed blocks.

In another implementation of the first aspect of the present disclosure, the method further includes determining an extrapolation merge index of the block unit from the video data, where selecting the extrapolation reference candidate from the multiple extrapolation merge candidates for the block unit is further based on the extrapolation merge index of the block unit.

In another implementation of the first aspect of the present disclosure, the method further includes determining an extrapolation merge flag of the block unit from the video data for indicating whether the block unit inherits multiple extrapolation reference parameters from the extrapolation merge list of the block unit, where the extrapolation merge list of the block unit is determined when the extrapolation merge flag of the block unit is equal to one.

In a second aspect of the present disclosure, an electronic device for decoding video data is provided. The electronic device includes at least one processor; and one or more non-transitory computer-readable media coupled to the at least one processor and storing one or more computer-executable instructions that, when executed by the at least one processor, cause the electronic device to: receive the video data; determine a block unit from a current frame included in the video data; determine an extrapolation merge list of the block unit, the extrapolation merge list including multiple extrapolation merge candidates, where each of the multiple extrapolation merge candidates includes multiple previous extrapolation parameters used to reconstruct a corresponding one of multiple extrapolation-reconstructed blocks; select an extrapolation reference candidate from the multiple extrapolation merge candidates for the block unit, where the extrapolation reference candidate is one of the multiple extrapolation merge candidates; determine an extrapolation prediction filter of the block unit based on the extrapolation reference candidate; and reconstruct the block unit based on the extrapolation prediction filter.

In an implementation of the second aspect of the present disclosure, each of the multiple extrapolation merge candidates of the block unit corresponds to one of multiple extrapolation candidate filters, and determining the extrapolation prediction filter of the block unit is further based on an extrapolation reference filter that is determined from the multiple extrapolation candidate filters and that corresponds to the extrapolation reference candidate.

In another implementation of the second aspect of the present disclosure, a specific one of the multiple extrapolation-reconstructed blocks corresponding to the extrapolation reference candidate is reconstructed using the extrapolation reference filter.

In another implementation of the second aspect of the present disclosure, the extrapolation prediction filter of the block unit is identical to the extrapolation reference filter when the block unit directly inherits the extrapolation reference filter.

In another implementation of the second aspect of the present disclosure, the one or more computer-executable instructions, when executed by the at least one processor, further cause the electronic device to: determine multiple extrapolation reference parameters of the extrapolation reference candidate from the multiple previous extrapolation parameters, where: the extrapolation reference candidate corresponds to an extrapolation reference filter, and the multiple extrapolation reference parameters includes an extrapolation reference filter shape of the extrapolation reference filter.

In another implementation of the second aspect of the present disclosure, the multiple extrapolation reference parameters further include multiple extrapolation reference coefficients of the extrapolation reference filter, and determining the extrapolation prediction filter of the block unit is further based on the extrapolation reference filter shape and the multiple extrapolation reference coefficients of the extrapolation reference filter.

In another implementation of the second aspect of the present disclosure, the multiple extrapolation reference parameters further include an extrapolation reference area type of the extrapolation reference candidate, and determining the extrapolation prediction filter of the block unit is further based on the extrapolation reference area type of the extrapolation reference candidate and the extrapolation reference filter shape of the extrapolation reference filter when the block unit inherits the extrapolation reference area type of the extrapolation reference candidate.

In another implementation of the second aspect of the present disclosure, the one or more computer-executable instructions, when executed by the at least one processor, further cause the electronic device to: determine an extrapolation neighboring area of the block unit neighboring the block unit based on the extrapolation reference area type of the extrapolation reference candidate; and derive multiple extrapolation prediction coefficients of the extrapolation prediction filter based on the extrapolation reference filter shape of the extrapolation reference filter and the extrapolation neighboring area of the block unit.

In another implementation of the second aspect of the present disclosure, a shape of the extrapolation neighboring area of the block unit is identical to a shape of an extrapolation reference area of a specific one of the multiple extrapolation-reconstructed blocks corresponding to the extrapolation reference candidate, the extrapolation reference area determined based on the extrapolation reference area type of the extrapolation reference candidate, and a size of the extrapolation neighboring area of the block unit is proportional to a size of the extrapolation reference area based on a size relationship between the block unit and the specific one of the multiple extrapolation-reconstructed blocks.

In another implementation of the second aspect of the present disclosure, the one or more computer-executable instructions, when executed by the at least one processor, further cause the electronic device to: determine an extrapolation merge index of the block unit from the video data, where selecting the extrapolation reference candidate from the multiple extrapolation merge candidates for the block unit is further based on the extrapolation merge index of the block unit.

In another implementation of the second aspect of the present disclosure, the one or more computer-executable instructions, when executed by the at least one processor, further cause the electronic device to: determine an extrapolation merge flag of the block unit from the video data for indicating whether the block unit inherits multiple extrapolation reference parameters from the extrapolation merge list of the block unit, where the extrapolation merge list of the block unit is determined when the extrapolation merge flag of the block unit is equal to one.

BRIEF DESCRIPTION OF THE DRAWINGS

Aspects of the present disclosure are best understood from the following detailed disclosure and the corresponding figures. Various features are not drawn to scale and dimensions of various features may be arbitrarily increased or reduced for clarity of discussion.

DETAILED DESCRIPTION

Figure 1:
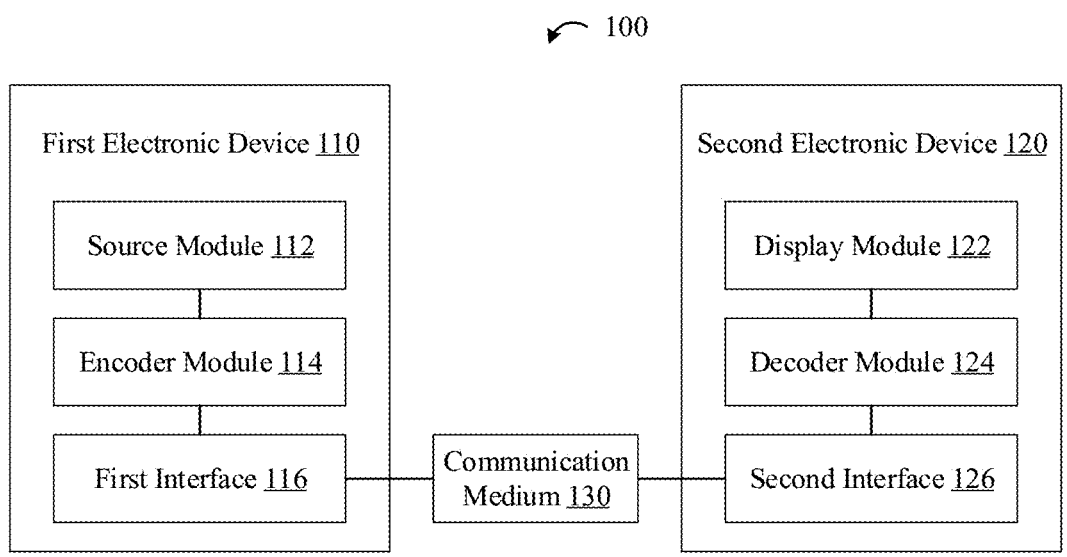
FIG. 1 is a block diagram illustrating a system having a first electronic device and a second electronic device for encoding and decoding video data, in accordance with one or more example implementations of this disclosure.

The following disclosure contains specific information pertaining to implementations in the present disclosure. The figures and the corresponding detailed disclosure are directed to example implementations. However, the present disclosure is not limited to these example implementations. Other variations and implementations of the present disclosure will occur to those skilled in the art.

Unless noted otherwise, like or corresponding elements among the figures may be indicated by like or corresponding reference designators. The figures and illustrations in the present disclosure are generally not to scale and are not intended to correspond to actual relative dimensions.

For the purposes of consistency and case of understanding, features are identified (although, in some examples, not illustrated) by reference designators in the exemplary figures. However, the features in different implementations may differ in other respects and shall not be narrowly confined to what is illustrated in the figures.

The disclosure uses the phrases "in one implementation," or "in some implementations," which may refer to one or more of the same or different implementations. The term "coupled" is defined as connected, whether directly or indirectly through intervening components, and is not necessarily limited to physical connections. The term "comprising" means "including, but not necessarily limited to" and specifically indicates open-ended inclusion or membership in the so-described combination, group, series, and the equivalent.

For purposes of explanation and non-limitation, specific details, such as functional entities, techniques, protocols, and standards, are set forth for providing an understanding of the disclosed technology. Detailed disclosure of well-known methods, technologies, systems, and architectures are omitted so as not to obscure the present disclosure with unnecessary details.

Persons skilled in the art will recognize that any disclosed coding function(s) or algorithm(s) described in the present disclosure may be implemented by hardware, software, or a combination of software and hardware. Disclosed functions may correspond to modules that are software, hardware, firmware, or any combination thereof.

A software implementation may include a program having one or more computer-executable instructions stored on a computer-readable medium, such as memory or other types of storage devices. For example, one or more microprocessors or general-purpose computers with communication processing capability may be programmed with computer-executable instructions and perform the disclosed function(s) or algorithm(s).

The microprocessors or general-purpose computers may be formed of application-specific integrated circuits (ASICs), programmable logic arrays, and/or one or more digital signal processors (DSPs). Although some of the disclosed implementations are oriented to software installed and executing on computer hardware, alternative implementations implemented as firmware, as hardware, or as a combination of hardware and software are well within the scope of the present disclosure. The computer-readable medium includes, but is not limited to, random-access memory (RAM), read-only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-executable instructions. The computer-readable medium may be a non-transitory computer-readable medium.

FIG. 1 is a block diagram illustrating a system 100 having a first electronic device and a second electronic device for encoding and decoding video data, in accordance with one or more example implementations of this disclosure.

The system 100 includes a first electronic device 110, a second electronic device 120, and a communication medium 130.

The first electronic device 110 may be a source device including any device configured to encode video data and transmit the encoded video data to the communication medium 130. The second electronic device 120 may be a destination device including any device configured to receive encoded video data via the communication medium 130 and decode the encoded video data.

The first electronic device 110 may communicate via wire, or wirelessly, with the second electronic device 120 via the communication medium 130. The first electronic device 110 may include a source module 112, an encoder module 114, and a first interface 116, among other components. The second electronic device 120 may include a display module 122, a decoder module 124, and a second interface 126, among other components. The first electronic device 110 may be a video encoder and the second electronic device 120 may be a video decoder.

The first electronic device 110 and/or the second electronic device 120 may be a mobile phone, a tablet, a desktop, a notebook, or other electronic devices. FIG. 1 illustrates one example of the first electronic device 110 and the second electronic device 120. The first electronic device 110 and second electronic device 120 may include greater or fewer components than illustrated or have a different configuration of the various illustrated components.

The source module 112 may include a video capture device to capture new video, a video archive to store previously captured video, and/or a video feed interface to receive the video from a video content provider. The source module 112 may generate computer graphics-based data, as the source video, or may generate a combination of live video, archived video, and computer-generated video, as the source video. The video capture device may include a charge-coupled device (CCD) image sensor, a complementary metal-oxide-semiconductor (CMOS) image sensor, or a camera.

The encoder module 114 and the decoder module 124 may each be implemented as any one of a variety of suitable encoder/decoder circuitry, such as one or more microprocessors, a central processing unit (CPU), a graphics processing unit (GPU), a system-on-a-chip (SoC), digital signal processors (DSPs), application-specific integrated circuits (ASICs), field-programmable gate arrays (FPGAs), discrete logic, software, hardware, firmware, or any combinations thereof. When implemented partially in software, a device may store the program having computer-executable instructions for the software in a suitable, non-transitory computer-readable medium and execute the stored computer-executable instructions using one or more processors to perform the disclosed methods. Each of the encoder module 114 and the decoder module 124 may be included in one or more encoders or decoders, any of which may be integrated as part of a combined encoder/decoder (CODEC) in a device.

The first interface 116 and the second interface 126 may utilize customized protocols or follow existing standards or de facto standards including, but not limited to, Ethernet, IEEE 802.11 or IEEE 802.15 series, wireless USB, or telecommunication standards including, but not limited to, Global System for Mobile Communications (GSM), Code-Division Multiple Access 2000 (CDMA2000), Time Division Synchronous Code Division Multiple Access (TD-SCDMA), Worldwide Interoperability for Microwave Access (WiMAX), Third Generation Partnership Project Long-Term Evolution (3GPP-LTE), or Time-Division LTE (TD-LTE). The first interface 116 and the second interface 126 may each include any device configured to transmit a compliant video bitstream via the communication medium 130 and to receive the compliant video bitstream via the communication medium 130.

The first interface 116 and the second interface 126 may include a computer system interface that enables a compliant video bitstream to be stored on a storage device or to be received from the storage device. For example, the first interface 116 and the second interface 126 may include a chipset supporting Peripheral Component Interconnect (PCI) and Peripheral Component Interconnect Express (PCIe) bus protocols, proprietary bus protocols, Universal Serial Bus (USB) protocols, Inter-Integrated Circuit (I2C) protocols, or any other logical and physical structure(s) that may be used to interconnect peer devices.

The display module 122 may include a display using liquid crystal display (LCD) technology, plasma display technology, organic light-emitting diode (OLED) display technology, or light-emitting polymer display (LPD) technology, with other display technologies used in some other implementations. The display module 122 may include a High-Definition display or an Ultra-High-Definition display.

Figure 2:
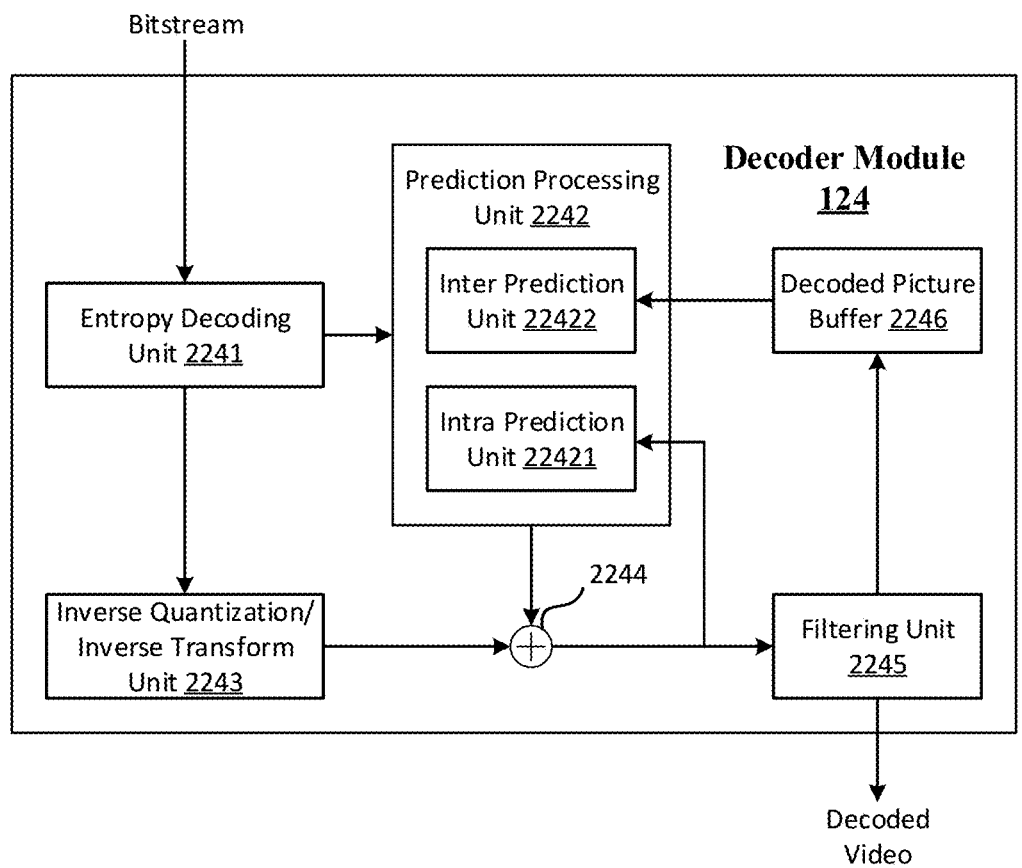
FIG. 2 is a block diagram illustrating a decoder module of the second electronic device illustrated in FIG. 1, in accordance with one or more example implementations of this disclosure.

FIG. 2 is a block diagram illustrating a decoder module 124 of the second electronic device 120 illustrated in FIG. 1, in accordance with one or more example implementations of this disclosure. The decoder module 124 may include an entropy decoder (e.g., an entropy decoding unit 2241), a prediction processor (e.g., a prediction processing unit 2242), an inverse quantization/inverse transform processor (e.g., an inverse quantization/inverse transform unit 2243), a summer (e.g., a summer 2244), a filter (e.g., a filtering unit 2245), and a decoded picture buffer (e.g., a decoded picture buffer 2246). The prediction processing unit 2242 further may include an intra prediction processor (e.g., an intra prediction unit 22421) and an inter prediction processor (e.g., an inter prediction unit 22422). The decoder module 124 receives a bitstream, decodes the bitstream, and outputs a decoded video.

The entropy decoding unit 2241 may receive the bitstream including multiple syntax elements from the second interface 126, as shown in FIG. 1, and perform a parsing operation on the bitstream to extract syntax elements from the bitstream. As part of the parsing operation, the entropy decoding unit 2241 may entropy decode the bitstream to generate quantized transform coefficients, quantization parameters, transform data, motion vectors, intra modes, partition information, and/or other syntax information.

The entropy decoding unit 2241 may perform context-adaptive variable length coding (CAVLC), context-adaptive binary arithmetic coding (CABAC), syntax-based context-adaptive binary arithmetic coding (SBAC), probability interval partitioning entropy (PIPE) coding, or another entropy coding technique to generate the quantized transform coefficients. The entropy decoding unit 2241 may provide the quantized transform coefficients, the quantization parameters, and the transform data to the inverse quantization/inverse transform unit 2243 and provide the motion vectors, the intra modes, the partition information, and other syntax information to the prediction processing unit 2242.

The prediction processing unit 2242 may receive syntax elements, such as motion vectors, intra modes, partition information, and other syntax information, from the entropy decoding unit 2241. The prediction processing unit 2242 may receive the syntax elements including the partition information and divide image frames according to the partition information.

Each of the image frames may be divided into at least one image block according to the partition information. The at least one image block may include a luminance block for reconstructing multiple luminance samples and at least one chrominance block for reconstructing multiple chrominance samples. The luminance block and the at least one chrominance block may be further divided to generate macroblocks, coding tree units (CTUs), coding blocks (CBs), subdivisions thereof, and/or other equivalent coding units.

During the decoding process, the prediction processing unit 2242 may receive predicted data including the intra mode or the motion vector for a current image block of a specific one of the image frames. The current image block may be the luminance block or one of the chrominance blocks in the specific image frame.

The intra prediction unit 22421 may perform intra-predictive coding of a current block unit relative to one or more neighboring blocks in the same frame, as the current block unit, based on syntax elements related to the intra mode in order to generate a predicted block. The intra mode may specify the location of reference samples selected from the neighboring blocks within the current frame. The intra prediction unit 22421 may reconstruct multiple chroma components of the current block unit based on multiple luma components of the current block unit when the multiple chroma components is reconstructed by the prediction processing unit 2242.

The intra prediction unit 22421 may reconstruct multiple chroma components of the current block unit based on the multiple luma components of the current block unit when the multiple luma components of the current block unit is reconstructed by the prediction processing unit 2242.

The inter prediction unit 22422 may perform inter-predictive coding of the current block unit relative to one or more blocks in one or more reference image blocks based on syntax elements related to the motion vector in order to generate the predicted block. The motion vector may indicate a displacement of the current block unit within the current image block relative to a reference block unit within the reference image block. The reference block unit may be a block determined to closely match the current block unit. The inter prediction unit 22422 may receive the reference image block stored in the decoded picture buffer 2246 and reconstruct the current block unit based on the received reference image blocks.

The inverse quantization/inverse transform unit 2243 may apply inverse quantization and inverse transformation to reconstruct the residual block in the pixel domain. The inverse quantization/inverse transform unit 2243 may apply inverse quantization to the residual quantized transform coefficient to generate a residual transform coefficient and then apply inverse transformation to the residual transform coefficient to generate the residual block in the pixel domain.

The inverse transformation may be inversely applied by the transformation process, such as a discrete cosine transform (DCT), a discrete sine transform (DST), an adaptive multiple transform (AMT), a mode-dependent non-separable secondary transform (MDNSST), a Hypercube-Givens transform (HyGT), a signal-dependent transform, a Karhunen-Loeve transform (KLT), a wavelet transform, an integer transform, a sub-band transform, or a conceptually similar transform. The inverse transformation may convert the residual information from a transform domain, such as a frequency domain, back to the pixel domain, etc. The degree of inverse quantization may be modified by adjusting a quantization parameter.

The summer 2244 may add the reconstructed residual block to the predicted block provided by the prediction processing unit 2242 to produce a reconstructed block.

The filtering unit 2245 may include a deblocking filter, a sample adaptive offset (SAO) filter, a bilateral filter, and/or an adaptive loop filter (ALF) to remove the blocking artifacts from the reconstructed block. Additional filters (in loop or post loop) may also be used in addition to the deblocking filter, the SAO filter, the bilateral filter, and the ALF. Such filters (are not explicitly illustrated for brevity of the description) may filter the output of the summer 2244. The filtering unit 2245 may output the decoded video to the display module 122 or other video receiving units after the filtering unit 2245 performs the filtering process for the reconstructed blocks of the specific image frame.

The decoded picture buffer 2246 may be a reference picture memory that stores the reference block to be used by the prediction processing unit 2242 in decoding the bitstream (e.g., in inter-coding modes). The decoded picture buffer 2246 may be formed by any one of a variety of memory devices, such as a dynamic random-access memory (DRAM), including synchronous DRAM (SDRAM), magneto-resistive RAM (MRAM), resistive RAM (RRAM), or other types of memory devices. The decoded picture buffer 2246 may be on-chip along with other components of the decoder module 124 or may be off-chip relative to those components.

Figure 3:
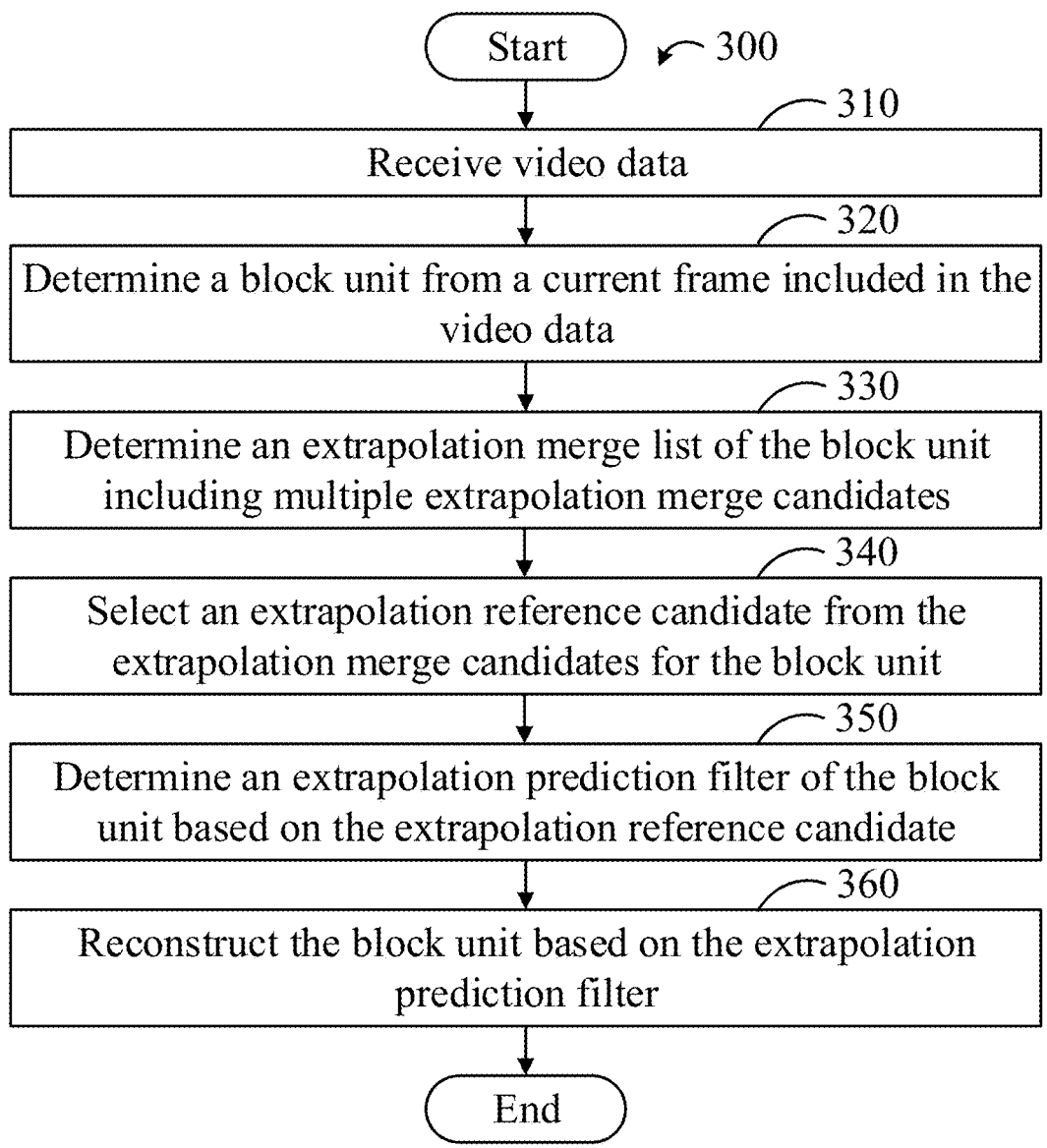
FIG. 3 is a flowchart illustrating a method/process for decoding and/or encoding video data by an electronic device, in accordance with one or more example implementations of this disclosure.

FIG. 3 is a flowchart illustrating a method/process 300 for decoding and/or encoding video data by an electronic device, in accordance with one or more example implementations of this disclosure. The method/process 300 is an example implementation, as there may be a variety of mechanisms of decoding the video data.

The method/process 300 may be performed by an electronic device using the configurations illustrated in FIGS. 1 and/or 2, where various elements of these figures may be referenced to describe the method/process 300. Each block illustrated in FIG. 3 may represent one or more processes, methods, or subroutines performed by an electronic device.

The order in which the blocks appear in FIG. 3 is for illustration only, and may not be construed to limit the scope of the present disclosure, thus the order may be different from what is illustrated. Additional blocks may be added or fewer blocks may be utilized without departing from the scope of the present disclosure.

At block 310, the method/process 300 may start by receiving (e.g., via the decoder module 124, as shown in FIG. 2) the video data. The video data received by the decoder module 124 may include a bitstream.

With reference to FIGS. 1 and 2, the second electronic device 120 may receive the bitstream from an encoder, such as the first electronic device 110 (or other video providers) via the second interface 126.

At block 320, the decoder module 124 may determine a block unit from a current frame included in the video data.

With reference to FIGS. 1 and 2, the decoder module 124 may determine the image frames included in the bitstream when the video data received by the decoder module 124 includes the bitstream. The current frame may be one of the image frames determined, according to the bitstream. The decoder module 124 may further divide the current frame to determine the block unit, according to the partition indications in the bitstream. In some implementations, the decoder module 124 may divide the current frame to generate multiple CTUs, and may further divide a current CTU included in the CTUs to generate multiple divided blocks and to determine the block unit from the divided blocks, according to the partition indications (e.g., based on any video coding standard). In some other implementations, the decoder module 124 may divide the current frame to generate multiple slices, and further divide a current slice included in the slices to generate multiple CTUs. In addition, the decoder module 124 may further divide a current CTU included in the CTUs to generate multiple divided blocks and to determine the block unit from the divided blocks, according to the partition indications. The size of the block unit may be Wbx Hb. In some implementations, each of the Wb and Hb may be a positive integer (e.g., 4, 8, etc.) that may be equal to, or different from, each other.

At block 330, the decoder module 124 may determine an extrapolation merge list of the block unit. The extrapolation merge list may include multiple extrapolation merge candidates.

Each of the extrapolation merge candidates of the block unit may correspond to one of multiple extrapolation-reconstructed blocks. Each of the extrapolation-reconstructed blocks may be predicted and/or reconstructed using a corresponding one of multiple extrapolation candidate filters in an extrapolation filter-based intra prediction (EIP) mode prior to the reconstruction of the block unit. Thus, each of the extrapolation merge candidates of the block unit may correspond to one of the extrapolation candidate filters. In addition, each of the extrapolation candidate filters may be derived based on multiple previous extrapolation parameters of a corresponding one of the extrapolation-reconstructed blocks. Thus, each of the extrapolation merge candidates may include the corresponding previous extrapolation parameters used to predict and/or reconstruct a corresponding one of the extrapolation-reconstructed blocks.

In some implementations, the previous extrapolation parameters in each of the extrapolation merge candidates may include a previous extrapolation filter shape of a corresponding one of the extrapolation candidate filters. In some implementations, the previous extrapolation parameters in one of the extrapolation merge candidates may include the previous extrapolation filter shape and multiple previous extrapolation coefficients of the corresponding extrapolation candidate filter. In some other implementations, the previous extrapolation parameters in one of the extrapolation merge candidates may include the previous extrapolation filter shape of the corresponding extrapolation candidate filter and a previous extrapolation area type of the one of the extrapolation merge candidates.

The previous extrapolation filter shape in each of the extrapolation merge candidates may be selected from multiple extrapolation filter shape candidates. The selected extrapolation filter shape candidate may be used to determine which ones of multiple reconstructed neighboring samples may be applied to an extrapolation filter to generate a predicted value for a sample position in a coding block, such as the block unit and the extrapolation-reconstructed blocks. For example, when the coding block may be predicted and/or reconstructed in the EIP mode, the coding block may be predicted using one of the following extrapolation functions:

$$pred\,(x,\,y) = \sum_{i=0}^{13}(c_i \times t(x - \text{Offset}X_i,\,y - \text{Offset}Y_i)) + c_{14} \times 2^{bitdepth-1}$$

$$pred\,(x,\,y) = \text{clip}\,(\max,\,\min,\,\sum_{i=0}^{14}(c_i \times t(x - \text{Offset}X_i,\,y - \text{Offset}Y_i) - \text{offset}) + \text{offset}$$

where the coefficients, $c_0$-$c_{14}$, may be fifteenth filter coefficients for the reconstructed neighboring samples determined based on the extrapolation filter shape candidates, each of the values, $t(x-\text{Offset}X_i, y-\text{Offset}Y_i)$, may be one of reconstructed or predicted sample values of one of the reconstructed neighboring samples for predicting a current sample position, (x, y), relative to a top-left chroma sample of the coding block, an offset value, $\text{Offset}X_i$, may be a horizontal offset between the one of the reconstructed neighboring samples and the current sample position of the coding block, and an offset value, $\text{Offset}Y_i$, may be a vertical offset between the one of the reconstructed neighboring samples and the current sample position of the coding block. In addition, a value, pred (x, y), may be a predicted sample value for the current sample position (x, y) of the coding block, a function, clip (,,), may be a clipping function used in the video coding standard, variables, min and max, may be maximum and minimum sample values, a variable, offset, may be an offset value, and a parameter, bitDepth, may be a bit-depth of the samples in the bitstream. It should be noted that the extrapolation functions may be changed without departing from the scope of the present disclosure.

Figure 4A:
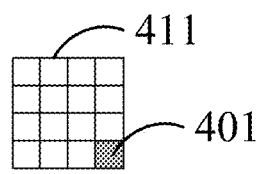
FIGS. 4A-4C are schematic illustrations of multiple extrapolation filter regions corresponding to the extrapolation filter shape candidates, in accordance with one or more example implementations of this disclosure.
Figure 4B:
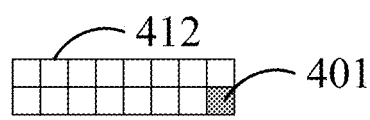
Figure 4C:
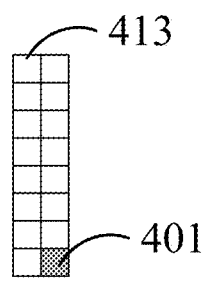

FIGS. 4A-4C are schematic illustrations of multiple extrapolation filter regions 411-413 corresponding to the extrapolation filter shape candidates, in accordance with one or more example implementations of this disclosure. Additional extrapolation filter shape candidates may be added or fewer type candidates may be utilized without departing from the scope of the present disclosure. Multiple neighboring sample positions in the extrapolation filter regions 411-413 may be located above a current sample position 401, located at a left side of the current sample position 401, and/or located at a top-left side of the current sample position 401.

In some implementations, three neighboring sample positions in the extrapolation filter region 411, as shown in FIG. 4A, may be located above the current sample position 401, three neighboring sample positions in the extrapolation filter region 411 may be located at the left side of the current sample position 401, and nine neighboring sample positions in the extrapolation filter region 411 may be located at the top-left side of the current sample position 401. In addition, the shape of a combination of the neighboring sample positions in the extrapolation filter region 411 and the current sample position 401 may be a square, and the size of the combination may be 4×4. When the extrapolation filter shape candidate, corresponding to the extrapolation filter region 411, as shown in FIG. 4A, may be selected for the coding block, a sample value located at the current sample position 401 may be predicted based on the reconstructed neighboring samples located at the neighboring sample positions in the extrapolation filter region 411.

In some other implementations, one neighboring sample position in the extrapolation filter region 412, as shown in FIG. 4B, may be located above the current sample position 401, seven neighboring sample positions in the extrapolation filter region 412 may be located at the left side of the current sample position 401, and seven neighboring sample positions in the extrapolation filter region 412 may be located at the top-left side of the current sample position 401. In addition, the shape of the combination of the neighboring sample positions in the extrapolation filter region 412 and the current sample position 401 may be a horizontal rectangle, and the size of the combination may be 8×2. When the extrapolation filter shape candidate, corresponding to the extrapolation filter region 412, as shown in FIG. 4B, may be selected for the coding block, the sample value located at the current sample position 401 may be predicted based on the reconstructed neighboring samples located at the neighboring sample positions in the extrapolation filter region 412.

In yet some other implementations, seven neighboring sample positions in the extrapolation filter region 413, as shown in FIG. 4C, may be located above the current sample position 401, one neighboring sample position in the extrapolation filter region 413 may be located at the left side of the current sample position 401, and seven neighboring sample positions in the extrapolation filter region 413 may be located at the top-left side of the current sample position 401. In addition, the shape of the combination of the neighboring sample positions in the extrapolation filter region 412 and the current sample position 401 may be a vertical rectangle, and the size of the combination may be 2×8. When the extrapolation filter shape candidate, corresponding to the extrapolation filter region 413, as shown in FIG. 4C, may be selected for the coding block, the sample value located at the current sample position 401 may be predicted based on the reconstructed neighboring samples located at the neighboring sample positions in the extrapolation filter region 413.

Figure 5A:
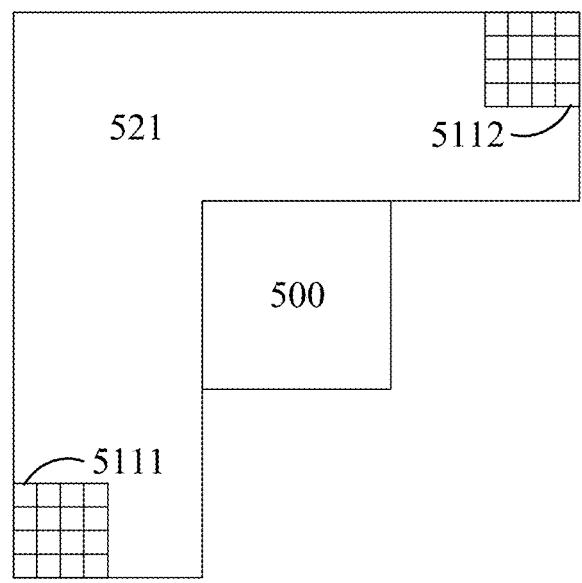
FIGS. 5A-5C are schematic illustrations of multiple extrapolation derived areas corresponding to the extrapolation area type candidates, in accordance with one or more example implementations of this disclosure.
Figure 5B:
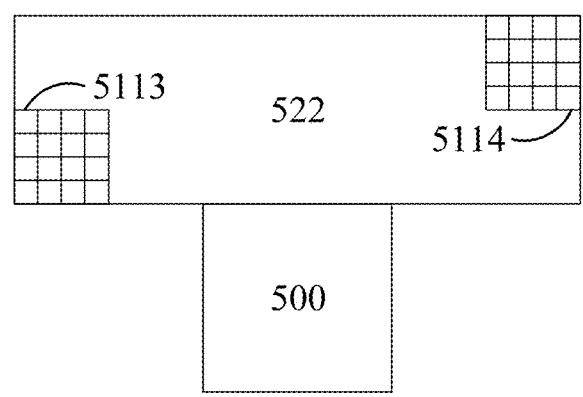
Figure 5C:
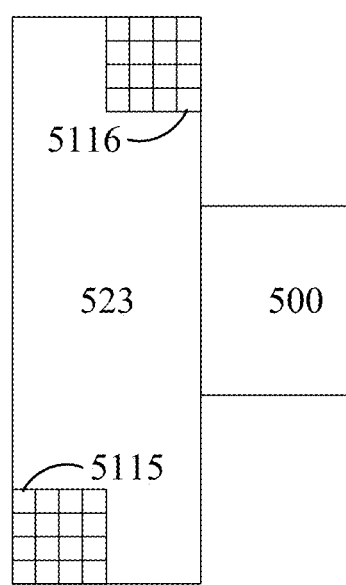

The previous extrapolation area type in each of the extrapolation merge candidates may be selected from multiple extrapolation area type candidates. The selected extrapolation area type candidate may be used to determine which ones of multiple reconstructed neighboring samples may be allowed to derive the extrapolation filter for predicting the coding block, such as the block unit and the extrapolation-reconstructed blocks. FIGS. 5A-5C are schematic illustrations of multiple extrapolation derived areas 521-523 corresponding to the extrapolation area type candidates, in accordance with one or more example implementations of this disclosure. Additional extrapolation area type candidates may be added or fewer type candidates may be utilized without departing from the scope of the present disclosure.

The extrapolation area type candidates may be used to determine the shapes of the extrapolation derived areas. In some implementations, the shape of the extrapolation derived area 521 of the coding block 500, as shown in FIG. 5A, may be a corner shape. In some other implementations, the shape of the extrapolation derived area 522 of the coding block 500, as shown in FIG. 5B, may be a horizontal rectangle, and the shape of the extrapolation derived area 523 of the coding block 500, as shown in FIG. 5C, may be a vertical rectangle. In some implementations, the coding block 500 may be one of the block unit or the extrapolation-reconstructed blocks. Multiple neighboring sample positions in an extrapolation derived area may be located above the coding block 500, located at a left side of the coding block 500, or located at a top-left side of the coding block 500.

An extrapolation derived area 521, as shown in FIG. 5A, may correspond to a first one of the extrapolation filter shape candidates. A portion of the neighboring sample positions in the extrapolation derived area 521 may be located above the coding block 500, another portion of the neighboring sample positions in the extrapolation derived area 521 may be located at the left side of the coding block 500, and the other portion of the neighboring sample positions in the extrapolation derived area 521 may be located at the top-left side of the coding block 500. In some implementations, the size of the extrapolation derived area 521 may include an area height, aboveSize, of the neighboring sample positions above the coding block 500 and an area width, leftSize, of the neighboring sample positions at the left side of the coding block 500. When the first extrapolation filter shape candidate may be selected for the coding block 500, the reconstructed neighboring samples in the extrapolation derived area 521 may be used to derive multiple extrapolation coefficients of the extrapolation filter of the coding block 500. For example, the reconstructed neighboring samples located in multiple extrapolation filter regions 5111 and 5112 may be used to derive the extrapolation coefficients of the extrapolation filter of the coding block 500, when the extrapolation filter shape candidate, corresponding to the extrapolation filter region 411, as shown in FIG. 4A, may be selected.

An extrapolation derived area 522, as shown in FIG. 5B, may correspond to a second one of the extrapolation filter shape candidates. Each of the neighboring sample positions in the extrapolation derived area 522 may be located above the coding block 500. In some implementations, the size of the extrapolation derived area 522 may include the area height, aboveSize, of the neighboring sample positions in the extrapolation derived area 522 and the area width, leftSize, of the neighboring sample positions at the top-left side of the coding block 500. When the second extrapolation filter shape candidate may be selected for the coding block 500, the reconstructed neighboring samples in the extrapolation derived area 522 may be used to derive the extrapolation coefficients of the extrapolation filter of the coding block 500. For example, the reconstructed neighboring samples located in multiple extrapolation filter regions 5113 and 5114 may be used to derive the extrapolation coefficients of the extrapolation filter of the coding block 500, when the extrapolation filter shape candidate, corresponding to the extrapolation filter region 411, as shown in FIG. 4A, may be selected.

An extrapolation derived area 523, as shown in FIG. 5C, may correspond to a third one of the extrapolation filter shape candidates. Each of the neighboring sample positions in the extrapolation derived area 523 may be located at the left side of the coding block 500. In some implementations, the size of the extrapolation derived area 523 may include the area height, aboveSize, of the neighboring sample positions at the top-left side of the coding block 500 and the area width, leftSize, of the neighboring sample positions in the extrapolation derived area 523. When the third extrapolation filter shape candidate may be selected for the coding block 500, the reconstructed neighboring samples in the extrapolation derived area 523 may be used to derive the extrapolation coefficients of the extrapolation filter of the coding block 500. For example, the reconstructed neighboring samples located in multiple extrapolation filter regions 5115 and 5116 may be used to derive the extrapolation coefficients of the extrapolation filter of the coding block 500, when the extrapolation filter shape candidate, corresponding to the extrapolation filter region 411, as shown in FIG. 4A, may be selected.

The size of the extrapolation derived area, such as the area width, leftSize, and the area height, aboveSize, may be determined based on at least one of the size or the extrapolation filter shape candidate of the coding block. In some implementations, the size of the extrapolation derived area may be determined only based on the size of the coding block. Thus, the size of the extrapolation derived areas may be determined only based on at least one of a width, Wc, or a height, Hc, of the coding block. In some implementations, the size of the extrapolation derived areas may be determined only based on one of the width, Wc, and the height, Hc, of the coding block. The one of the width, Wc. and the height, Hc, of the coding block may be a shorter one, a longer one, or a predefined one of the width, Wc, and the height, Hc, of the coding block. For example, when the width, Wc, and the height, Hc, of the coding block are, respectively, 8 and 16, the size of the extrapolation derived areas may be determined based on the shorter one of the width, Wc, and the height, Hc, of the coding block, equal to 8.

In some other implementations, the size of the extrapolation derived area may be determined only based on the extrapolation filter shape candidate of the coding block. Thus, the size of the extrapolation derived area may be determined based on the extrapolation filter region selected based on the extrapolation filter shape candidates. For example, when the size of the extrapolation filter region of the coding block may be Wr×Hr, the area width, leftSize, of the extrapolation derived area may be equal to, or greater than, Wr, and the area height, aboveSize, may be equal to, or greater than, Hr for the coding block to have enough predicted values to be applied to the extrapolation filter.

In yet some other implementations, the size of the extrapolation derived area may be determined based on both of the size and the extrapolation filter shape candidate of the coding block. For example, when the size of the coding block may be Wc x Hc and the size of the extrapolation filter region of the coding block may be Wr×Hr, the area width, leftSize, of the extrapolation derived area may be equal to, or greater than, min (Wc, Hc)+Wr−1, and the area height, aboveSize, may be equal to, or greater than, min (Wc, Hc)+Hr−1.

The extrapolation merge candidates of the block unit may be selected from multiple extrapolation predefined candidates. In some implementations, the extrapolation predefined candidates may include at least one of multiple spatial adjacent extrapolation merge candidates, multiple spatial non-adjacent extrapolation merge candidates, multiple temporal extrapolation merge candidates, multiple history-based extrapolation merge candidates, multiple pairwise extrapolation merge candidates, or multiple default extrapolation merge candidates. Additional candidate types may be added or fewer candidate types may be utilized without departing from the scope of the present disclosure.

When one of multiple reference candidate blocks of the block unit, determined based on one of the extrapolation predefined candidates, is predicted in the EIP mode, the one of the reference candidate blocks may be selected as one of the extrapolation-reconstructed blocks. In some implementations, the previous extrapolation parameters of the extrapolation candidate filter used to predict the one of the reference candidate blocks may be directly selected to generate one of the extrapolation merge candidates included in the extrapolation merge list. In some other implementations, when the previous extrapolation parameters of the extrapolation candidate filter used to predict the one of the reference candidate blocks are available to predict the block unit, the previous extrapolation parameters corresponding to the one of the reference candidate blocks may be selected to generate one of the extrapolation merge candidates included in the extrapolation merge list. However, when the previous extrapolation parameters of the extrapolation candidate filter used to predict the one of the reference candidate blocks are unavailable to predict the block unit, the previous extrapolation parameters corresponding to the one of the reference candidate blocks may be excluded in the extrapolation merge list.

Figure 6A:
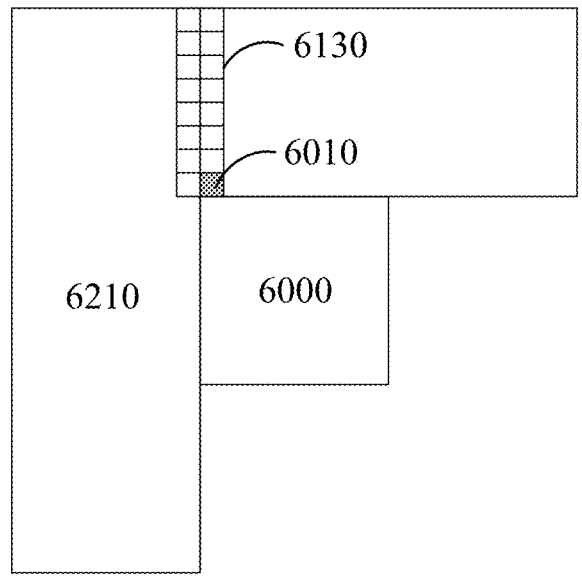
FIGS. 6A and 6B are schematic illustrations of an extrapolation-reconstructed block having a previous extrapolation area, and the block unit having an extrapolation neighboring area, in accordance with one or more example implementations of this disclosure.
Figure 6B:
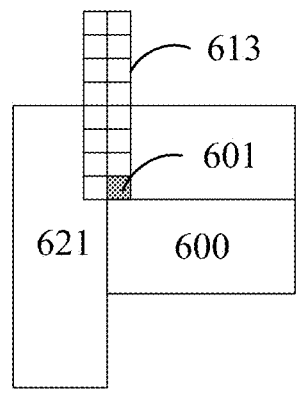

FIGS. 6A and 6B are schematic illustrations of an extrapolation-reconstructed block 6000 having a previous extrapolation area 6210, and the block unit 600 having an extrapolation neighboring area 621, in accordance with one or more example implementations of this disclosure. The previous extrapolation area 6210 may be the extrapolation derived area of the extrapolation-reconstructed block 6000 used to derive a previous extrapolation filter of the extrapolation-reconstructed block 6000. The previous extrapolation filter of the extrapolation-reconstructed block 6000 may be derived for predicting and/or reconstructing the extrapolation-reconstructed block 6000 using one of the extrapolation filter shape candidates corresponding to the extrapolation filter region 6130.

The reconstructed neighboring samples in the extrapolation filter region 6130 may be associated with the reconstructed neighboring sample, located at the current sample position 6010, to derive the previous extrapolation coefficients of the previous extrapolation filter of the extrapolation-reconstructed block 6000. The shape of the previous extrapolation area 6210 may be determined based on the extrapolation area type candidate of the extrapolation-reconstructed block 6000. In addition, the size of the previous extrapolation area 6210 may be determined based on at least one of the size or the extrapolation filter shape candidate of the extrapolation-reconstructed block 6000. For example, the size of the previous extrapolation area 6210 may be determined based on the size, e.g., 8×8, of the extrapolation-reconstructed block 6000. Thus, the area width, leftSize, and the area height, aboveSize, as shown in FIG. 6A, may be equal to 8.

When the extrapolation-reconstructed block 6000 corresponds to one of the extrapolation merge candidates, the previous extrapolation parameters corresponding to the extrapolation-reconstructed block 6000 may include the extrapolation filter shape candidate and the extrapolation area type candidate of the extrapolation-reconstructed block 6000. When the block unit inherits the extrapolation filter shape candidate and the extrapolation area type candidate of the extrapolation-reconstructed block 6000, the shape of the extrapolation filter region 613 of the block unit 600 corresponding to the extrapolation filter shape candidate of the extrapolation-reconstructed block 6000 may be identical to the shape of the extrapolation filter region 6130. In addition, the shape of the extrapolation neighboring area 621 of the block unit 600 corresponding to the extrapolation area type candidate of the extrapolation-reconstructed block 6000 may be identical to the shape of the previous extrapolation area 6210. The size of the extrapolation neighboring area 621 of the block unit 600 may be smaller than the size of the previous extrapolation area 6210, since the size, e.g., 8×4, of the block unit 600 may be smaller than the size of the extrapolation-reconstructed block 6000. In some implementations, the size of the extrapolation neighboring area 621 of the block unit 600 may be proportional to the size of the previous extrapolation area 6210 based on the size relationship between the block unit 621 and the previous extrapolation area 6210.

As shown in FIG. 6B, the reconstructed neighboring samples in the extrapolation filter region 613, used for deriving the extrapolation prediction filter of the block unit 600 may extend beyond the extrapolation neighboring area 621. Thus, the extrapolation filter shape candidate and the extrapolation area type candidate of the extrapolation-reconstructed block 6000 may be unavailable to be inherited by the block unit 600. In other words, although the extrapolation-reconstructed block 6000 may be predicted in the EIP mode, each of the reconstructed neighboring samples in each of the extrapolation filter regions, determined based on the extrapolation filter shape candidate of the extrapolation-reconstructed block 6000 may not be included in the extrapolation neighboring area 621, determined based on the extrapolation area type candidate of the extrapolation-reconstructed block 6000. Thus, the previous extrapolation parameters of the extrapolation-reconstructed block 6000 may be available or unavailable to predict the block unit 600. In some implementations, when each of the reconstructed neighboring samples in each of the extrapolation filter regions, determined based on the extrapolation filter shape candidate of the extrapolation-reconstructed block 6000 is included in the extrapolation neighboring area 621, the previous extrapolation parameters of the extrapolation-reconstructed block 6000 may be added into the extrapolation merge list. Thus, availability of the previous extrapolation parameters of the extrapolation-reconstructed block 6000 may be determined based on the extrapolation filter shape candidate of the extrapolation-reconstructed block 6000 and the extrapolation neighboring area 621 of the block unit to determine whether the previous extrapolation parameters may be allowable to be added into the extrapolation merge list.

Figure 7:
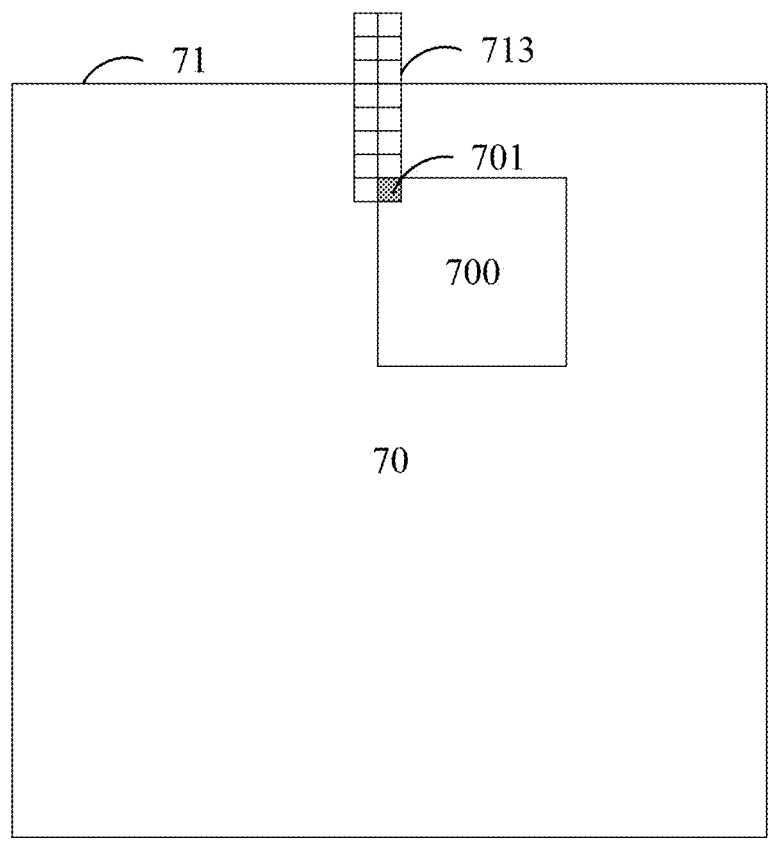
FIG. 7 is a schematic illustration of the block unit include in a coding region, in accordance with one or more example implementations of this disclosure.

FIG. 7 is a schematic illustration of the block unit 700 include in a coding region 70, in accordance with one or more example implementations of this disclosure. In some implementations, the coding region 70 may be one of the current frame, the current slice, and the current CTU. When the block unit 700 neighbors a region boundary 71 of the coding region 70, the reconstructed neighboring samples in the extrapolation filter region 713, used for predicting a sample value located at the current sample position 701 of the block unit 700 may extend beyond the coding region 70. Thus, the previous extrapolation parameters may be unavailable to be inherited by the block unit 600. In some implementations, the previous extrapolation parameters of the extrapolation-reconstructed block 6000 may include the extrapolation filter shape candidate and the extrapolation area type candidate of the extrapolation-reconstructed block 6000. In some other implementations, the previous extrapolation parameters of the extrapolation-reconstructed block 6000 may include the extrapolation filter shape candidate and the previous extrapolation coefficients of the extrapolation-reconstructed block 6000. In other words, although the extrapolation-reconstructed block 6000 may be predicted in the EIP mode, each of the reconstructed neighboring samples in each of the extrapolation filter regions, determined based on the extrapolation filter shape candidate of the extrapolation-reconstructed block 6000 may not be included in the coding region 70. Thus, the previous extrapolation parameters of the extrapolation-reconstructed block 6000 may be available or unavailable to predict the block unit 600.

In some implementations, when each of the reconstructed neighboring samples in each of the extrapolation filter regions, determined based on the extrapolation filter shape candidate of the extrapolation-reconstructed block 6000 is included in the coding region 70, the previous extrapolation parameters of the extrapolation-reconstructed block 6000 may be added into the extrapolation merge list. Thus, availability of the previous extrapolation parameters of the extrapolation-reconstructed block 6000 may be determined based on the extrapolation filter shape candidate of the extrapolation-reconstructed block 6000 and the relative location between the coding region 70 and the block unit 700 to determine whether the previous extrapolation parameters may be allowable to be added into the extrapolation merge list. Therefore, since the reconstructed neighboring samples in the extrapolation filter region 713 may be available or unavailable to predict the block unit, the previous extrapolation parameters including at least one of the extrapolation filter shape candidate, the extrapolation area type candidate and the extrapolation area type candidate of the extrapolation-reconstructed block 6000 may be included or excluded in the extrapolation merge list.

When the extrapolation-reconstructed block 6000 corresponds to one of the extrapolation merge candidates, the previous extrapolation parameters corresponding to the extrapolation-reconstructed block 6000 may include the extrapolation filter shape candidate and the previous extrapolation coefficients of the extrapolation-reconstructed block 6000. Thus, when the block unit inherits the extrapolation filter shape candidate and the previous extrapolation coefficients of the extrapolation-reconstructed block 6000, the block unit may directly inherit extrapolation candidate filter of the extrapolation-reconstructed block 6000. Thus, the block unit may be directly predicted and/or reconstruct using the extrapolation candidate filter of the extrapolation-reconstructed block 6000 without deriving the extrapolation prediction coefficients of the block unit based on the reconstructed neighboring samples in the extrapolation derived area of the block unit.

Although the block unit may be directly predicted and/or reconstruct using the extrapolation candidate filter of the extrapolation-reconstructed block 6000, the extrapolation filter shape candidate and the previous extrapolation coefficients of the extrapolation-reconstructed block 6000 may still be unavailable when the reconstructed neighboring samples in the extrapolation filter region 713 extend beyond the coding region 70. Thus, availability of the previous extrapolation parameters may be determined based on the extrapolation filter shape candidate of the extrapolation-reconstructed block 6000 and the relative location between the block unit 700 and the coding region 70. Therefore, since the reconstructed neighboring samples in the extrapolation filter region 713 may be available or unavailable to predict the block unit, the previous extrapolation parameters including the extrapolation filter shape candidate and the previous extrapolation coefficients of the extrapolation-reconstructed block 6000 may be included or excluded in the extrapolation merge list.

The spatial adjacent extrapolation merge candidates may indicate multiple spatial adjacent extrapolation candidate blocks. Each of the spatial adjacent extrapolation candidate blocks may include at least one of multiple spatial adjacent extrapolation candidate samples. The spatial adjacent extrapolation candidate samples may be located, respectively, at one of multiple spatial adjacent extrapolation candidate positions. The spatial adjacent extrapolation candidate positions may include $(x+Wb-1, y-1)$, $(x-1, y+Hb-1)$, $(x+Wb, y-1)$, $(x-1, y+Hb)$, and $(x-1, y-1)$, when a top-left corner of the block unit is located at a top-left position $(x, y)$. When one of the spatial adjacent extrapolation candidate blocks is predicted using one of the extrapolation candidate filters in the EIP mode, the one of the spatial adjacent extrapolation candidate blocks may be selected as one of the extrapolation-reconstructed blocks.

In some implementations, the previous extrapolation parameters of the extrapolation candidate filter used to predict the one of the spatial adjacent extrapolation candidate blocks may be directly selected to generate one of the extrapolation merge candidates included in the extrapolation merge list. In some other implementations, when the previous extrapolation parameters of the extrapolation candidate filter used to predict the one of the spatial adjacent extrapolation candidate blocks are available to predict the block unit, the previous extrapolation parameters corresponding to the one of the spatial adjacent extrapolation candidate blocks may be allowed to generate one of the extrapolation merge candidates included in the extrapolation merge list. In addition, when the previous extrapolation parameters of the extrapolation candidate filter used to predict the one of the spatial adjacent extrapolation candidate blocks are unavailable to predict the block unit, the previous extrapolation parameters corresponding to the one of the spatial adjacent extrapolation candidate blocks may be excluded in the extrapolation merge list.

The spatial non-adjacent extrapolation merge candidates may indicate multiple spatial non-adjacent extrapolation candidate blocks. Each of the spatial non-adjacent extrapolation candidate blocks may include at least one of multiple spatial non-adjacent extrapolation candidate samples. The spatial non-adjacent extrapolation candidate samples may be located, respectively, at one of multiple spatial non-adjacent extrapolation candidate positions. The spatial non-adjacent extrapolation candidate positions may include at least one of multiple spatial non-adjacent positions in an inter merge mode of a video coding standard. When one of the spatial non-adjacent extrapolation candidate blocks is predicted using one of the extrapolation candidate filters in the EIP mode, the one of the spatial non-adjacent extrapolation candidate blocks may be selected as one of the extrapolation-reconstructed blocks.

In some implementations, the previous extrapolation parameters of the extrapolation candidate filter used to predict the one of the spatial non-adjacent extrapolation candidate blocks may be directly selected to generate one of the extrapolation merge candidates included in the extrapolation merge list. In some other implementations, when the previous extrapolation parameters of the extrapolation candidate filter used to predict the one of the spatial non-adjacent extrapolation candidate blocks are available to predict the block unit, the previous extrapolation parameters corresponding to the one of the spatial non-adjacent extrapolation candidate blocks may be allowed to generate one of the extrapolation merge candidates included in the extrapolation merge list. In addition, when the previous extrapolation parameters of the extrapolation candidate filter used to predict the one of the spatial non-adjacent extrapolation candidate blocks are unavailable to predict the block unit, the previous extrapolation parameters corresponding to the one of the spatial non-adjacent extrapolation candidate blocks may be excluded in the extrapolation merge list.

The temporal extrapolation merge candidates may indicate multiple temporal extrapolation candidate blocks. Each of the temporal extrapolation candidate blocks may include at least one of multiple temporal extrapolation candidate samples. The temporal extrapolation candidate samples may be located, respectively, at one of multiple temporal extrapolation candidate positions. The temporal extrapolation candidate positions may include multiple predefined locations of a reference picture in multiple reference picture lists. The reference picture lists may include a first reference picture list L0 and a second reference picture list LI. The temporal extrapolation candidate positions may include multiple identical temporal positions in the inter merge mode of the video coding standard. When a particular one of the temporal extrapolation candidate blocks is predicted using one of the extrapolation candidate filters in the EIP mode, the particular temporal extrapolation candidate block may be selected as one of the extrapolation-reconstructed blocks.

In some implementations, the previous extrapolation parameters of the extrapolation candidate filter used to predict the particular temporal extrapolation candidate block may be directly selected to generate one of the extrapolation merge candidates included in the extrapolation merge list. In some other implementations, when the previous extrapolation parameters of the extrapolation candidate filter used to predict the one of the temporal extrapolation candidate blocks are available to predict the block unit, the previous extrapolation parameters corresponding to the one of the temporal extrapolation candidate blocks may be allowed to generate one of the extrapolation merge candidates included in the extrapolation merge list. In addition, when the previous extrapolation parameters of the extrapolation candidate filter used to predict the one of the temporal extrapolation candidate blocks are unavailable to predict the block unit, the previous extrapolation parameters corresponding to the one of the temporal extrapolation candidate blocks may be excluded in the extrapolation merge list.

Multiple previous blocks reconstructed prior to the reconstruction of the block unit may be reconstructed based on multiple reconstruction schemes. When one of the previous blocks is reconstructed using one of the extrapolation candidate filters in the EIP mode, the previous extrapolation parameters of the extrapolation candidate filter used to predict the one of the previous blocks may be stored in an extrapolation table on a first-in-first-out (FIFO) basis. The size of the extrapolation table may be equal to Nt. In some implementations, Nt may be a positive integer, such as 6 or 12. In some implementations, the extrapolation table may be reset at a beginning of each CTU row. In some implementations, when the block unit is being reconstructed, the previous extrapolation parameters of the extrapolation candidate filters stored in the extrapolation table may be directly selected to generate one of the extrapolation merge candidates included in the extrapolation merge list.

In some other implementations, when the previous extrapolation parameters of the extrapolation candidate filters stored in the extrapolation table are available to predict the block unit, the previous extrapolation parameters of the extrapolation candidate filters stored in the extrapolation table may be allowed to generate one of the extrapolation merge candidates included in the extrapolation merge list. In addition, when the previous extrapolation parameters of the extrapolation candidate filters stored in the extrapolation table are unavailable to predict the block unit, the previous extrapolation parameters of the extrapolation candidate filters stored in the extrapolation table may be excluded in the extrapolation merge list.

The pair-wise extrapolation merge candidates may be generated by averaging pairs of the extrapolation merge candidates included in the extrapolation merge list. In some implementations, the pair-wise extrapolation merge candidates may be generated by using first two candidates of the extrapolation merge candidates included in the extrapolation merge list.

The number of the extrapolation merge candidates may be equal to Nc. In some implementations, the number Nc may be a positive integer, such as 6 or 12. In some implementations, the number Nc may be parsed and determined from a parameter set of the bitstream. The parameter set may include one of a video parameter set (VPS), a sequence parameter set (SPS), and a picture parameter set (PPS). In some other implementations, the number Nc may be parsed and determined from a parameter header of the bitstream. The parameter header may include one of a picture header, a tile header and a slice header having a header level higher than a header level of the block header.

With reference to FIGS. 1 and 2, when the decoder module 124 checks whether the spatial adjacent extrapolation merge candidates, the spatial non-adjacent extrapolation merge candidates, the temporal extrapolation merge candidates, the history-based extrapolation merge candidates, and the pair-wise extrapolation merge candidates are allowable to be added into the extrapolation merge candidates of the block unit, the decoder module 124 may also check whether the number of the added extrapolation merge candidates of the block unit may be equal to the number Nc. When the number of the added extrapolation merge candidates of the block unit is equal to the number Nc, the decoder module 124 may bypass checking and stop adding the extrapolation predefined candidates into the extrapolation merge candidates.

However, in some implementations, after the decoder module 124 finishes checking whether the spatial adjacent extrapolation merge candidates, the spatial non-adjacent extrapolation merge candidates, the temporal extrapolation merge candidates, the history-based extrapolation merge candidates, and the pair-wise extrapolation merge candidates are allowable to add into the extrapolation merge candidates of the block unit, the number of the added extrapolation merge candidates of the block unit may be still less than the number Nc. Thus, the decoder module 124 may add at least one of the default extrapolation merge candidates into the extrapolation merge candidates of the block unit. In some implementations, there may be one or more default extrapolation merge candidates. Each of the default extrapolation merge candidates may contain predefined extrapolation parameters. For example, there may be 15 predefined extrapolation filter coefficients, 1 predefined offset value, predefined minimum and maximum values for a default extrapolation merge candidate. Each of the one or more default extrapolation merge candidate may include different predefined extrapolation parameters.

Referring back to FIG. 3, at block 340, the decoder module 124 may select an extrapolation reference candidate from the extrapolation merge candidates for the block unit. The extrapolation reference candidate may be one of the extrapolation merge candidates.

With reference to FIGS. 1 and 2, the decoder module 124 may determine an arrangement of the extrapolation merge candidates based on multiple template cost values, and select all or a portion of the extrapolation merge candidates based on the determined arrangement of the extrapolation merge candidates to generate an extrapolation reordered list.

The decoder module 124 may determine a block template region neighboring the block unit in the current frame. The block template region may include at least one of a first block adjacent region, located at a left side of the block unit, a second block adjacent region, located above the block unit, a third block adjacent region, located at a top-left side of the block unit, a fourth block adjacent region, located at a bottom-left side of the block unit 600, and a fifth block adjacent region, located at an above-right side of the block unit. Since the first to the fifth block adjacent regions may be reconstructed prior to the reconstruction of the block unit, the block template region may be reconstructed prior to the reconstruction of the block unit. Thus, the decoder module 124 may be allowed to directly determine a reconstructed result of the block template region when the block unit is being predicted and/or reconstructed. In some implementations, the size of the block template region may be determined based on the size of the block unit.

The decoder module 124 may predict the block template region using the previous extrapolation parameters of each extrapolation merge candidate to generate multiple extrapolation template predictions. The decoder module 124 may determine the template cost values by comparing each of the extrapolation template predictions with the reconstructed result of the block template region. The difference between each of the extrapolation template predictions and the reconstructed result of the block template region may be calculated based on a Mean Squared Error (MSE) calculation. In addition, the difference between each of the extrapolation template predictions and the reconstructed result of the block template region may be calculated based on one of a Sum of Squared Error (SSE) calculation, a Mean Absolute Difference (MAD) calculation, a Sum of Absolute Difference (SAD) calculation, a Sum of Absolute Transformed Difference (SATD) calculation, and a mean-removed sum of absolute difference (MR-SAD) calculation.

The decoder module 124 may reorder the extrapolation merge candidates based on the determined arrangement to generate the extrapolation reordered list. In some implementations, the extrapolation merge candidates may be reordered in an ascending order or a descending order of the template cost values. In some implementations, the number of the extrapolation merge candidates in the extrapolation reordered list may be equal to, or less than, the number of the extrapolation merge candidates in the extrapolation merge list.

Before the arrangement is determined based on the template cost values, the extrapolation merge candidates may be ordered based on one or more arbitrary rules. The extrapolation merge candidates may be reordered in the ascending order of the template cost values. Thus, when the template cost value of a specific one of the extrapolation merge candidates is less than the template cost values of the other extrapolation merge candidates, the specific extrapolation merge candidate may be moved forward to be a first extrapolation merge candidate based on the determined arrangement. In other words, the specific extrapolation merge candidate may be moved to be the first extrapolation merge candidate when the template cost value of the specific extrapolation merge candidate is the minimum value of the template cost values.

In some implementations, the extrapolation merge candidates may be divided into different extrapolation groups in advance. Then, the extrapolation merge candidates in each of the extrapolation groups may be, respectively, reordered based on the template cost values of the extrapolation merge candidates in each of the extrapolation groups. In some implementations, the extrapolation groups may be generated based on multiple extrapolation types of the extrapolation predefined candidates. For example, the extrapolation merge candidates, determined from the spatial adjacent extrapolation merge candidates, may be added into a first extrapolation group, and the extrapolation merge candidates, determined from the spatial non-adjacent extrapolation merge candidates, may be added into a second extrapolation group.

In addition, the extrapolation merge candidates, determined from the temporal extrapolation merge candidates, may be added into a third extrapolation group, and the extrapolation merge candidates, determined from the history-based extrapolation merge candidates, may be added into a fourth extrapolation group. Thus, the extrapolation merge candidates in the extrapolation merge list may be arranged to generate the extrapolation reordered list based on the numbering order of each extrapolation group and the reordering of the extrapolation merge candidates within each extrapolation group. It should be noted that a division scheme of the extrapolation groups may be changed without departing from the scope of the present disclosure.

In some implementations, the decoder module 124 may select the extrapolation reference candidate from the extrapolation merge candidates in the extrapolation reordered list based on an extrapolation merge index of the block unit. The extrapolation merge index may be determined from the bitstream for the block unit. In some other implementations, the decoder module 124 may directly determine the first extrapolation merge candidate in the extrapolation reordered list as the extrapolation reference candidate without parsing the extrapolation merge index from the bitstream. Thus, the extrapolation merge index may be excluded from the bitstream. When the extrapolation merge candidates are reordered in the ascending order of the template cost values to generate the extrapolation reordered list, the first extrapolation merge candidate in the extrapolation reordered list may be the extrapolation merge candidate having the minimum value of the template cost values.

In yet some other implementations, the decoder module 124 may select the extrapolation reference candidate directly from the extrapolation merge candidates in the extrapolation merge list based on the extrapolation merge index of the block unit. In other words, the decoder module 124 may determine the extrapolation reference candidate without calculating the template cost values and reordering the extrapolation merge candidates. In some implementations, when the decoder module 124 selects the extrapolation reference candidate directly from the extrapolation merge list based on the extrapolation merge index, the construction of the extrapolation merge list may have an early termination mechanism based on the extrapolation merge index. Since the extrapolation merge list constructed by the decoder module 124 may be identical to that constructed by the encoder module 114. Thus, the order of the extrapolation merge candidates in the extrapolation merge list constructed by the decoder module 124 may be identical to the order of the extrapolation merge candidates in the extrapolation merge list constructed by the encoder module 114. The decoder module 124 may bypass checking and stop adding the extrapolation predefined candidates into the extrapolation merge candidates when the number of the added extrapolation merge candidates in the extrapolation merge list is equal to a value generated by adding one to the extrapolation merge index.

Referring back to FIG. 3, at block 350, the decoder module 124 may determine an extrapolation prediction filter of the block unit based on the extrapolation reference candidate.

Since each of the extrapolation merge candidates of the block unit may correspond to one of the extrapolation candidate filters, the extrapolation prediction filter of the block unit may be determined based on an extrapolation reference filter, determined from the extrapolation candidate filters. The extrapolation reference filter may correspond to the extrapolation reference candidate. In addition, a specific one of the extrapolation-reconstructed blocks corresponding to the extrapolation reference candidate may be reconstructed using the extrapolation reference filter. In some implementations, the extrapolation prediction filter of the block unit may be identical to the extrapolation reference filter corresponding to the extrapolation reference candidate when the block unit directly inherits the extrapolation reference filter of the specific extrapolation-reconstructed block.

Each of the extrapolation merge candidates may include the corresponding previous extrapolation parameters used to predict and/or reconstruct a corresponding one of the extrapolation-reconstructed blocks. Thus, when the extrapolation reference candidate is determined from the extrapolation merge candidates, the previous extrapolation parameters corresponding to the extrapolation reference candidate may also be determined as multiple extrapolation reference parameters of the extrapolation reference candidate. In some implementations, the extrapolation reference parameters of the extrapolation reference candidate may include an extrapolation reference filter shape of the extrapolation reference filter.

In some implementations, the previous extrapolation parameters in one of the extrapolation merge candidates may include the previous extrapolation filter shape and the previous extrapolation coefficients of the corresponding extrapolation candidate filter. Thus, the extrapolation reference parameters may include the previous extrapolation filter shape and the previous extrapolation coefficients of the extrapolation reference filter as the extrapolation reference filter shape and multiple extrapolation reference coefficients when the one of the extrapolation merge candidates is selected as the extrapolation reference candidate. The extrapolation prediction filter of the block unit may be determined based on the extrapolation reference coefficients and the extrapolation reference filter shape of the extrapolation reference filter when the block unit inherits the extrapolation reference coefficients of the extrapolation reference candidate. In some implementations, the extrapolation prediction filter of the block unit may be identical to the extrapolation reference filter corresponding to the extrapolation reference candidate when the block unit inherits the extrapolation reference coefficients and the extrapolation reference filter shape of the extrapolation reference filter.

In some other implementations, the previous extrapolation parameters in one of the extrapolation merge candidates may include the previous extrapolation filter shape of the corresponding extrapolation candidate filter and the previous extrapolation area type of the one of the extrapolation merge candidates. Thus, the extrapolation reference parameters may include the previous extrapolation filter shape of the corresponding extrapolation candidate filter and the previous extrapolation area type of the one of the extrapolation merge candidates as the extrapolation reference filter shape and the extrapolation reference area type when the one of the extrapolation merge candidates is selected as the extrapolation reference candidate. The extrapolation prediction filter of the block unit may be determined based on the extrapolation reference filter shape and the extrapolation reference area type of the extrapolation reference filter when the block unit inherits the extrapolation reference filter shape and the extrapolation reference area type of the extrapolation reference candidate.

When the block unit inherits the extrapolation reference area type of the extrapolation reference candidate, the decoder module 124 may determine the extrapolation neighboring area of the block unit neighboring the block unit based on the extrapolation reference area type of the extrapolation reference candidate. The decoder module 124 may determine an extrapolation prediction area type of the block unit based on the extrapolation reference area type of the extrapolation reference candidate.

In some implementations, the extrapolation prediction area type of the block unit may be identical to the extrapolation reference area type of the extrapolation reference candidate. Thus, the shape of the extrapolation neighboring area of the block unit may be identical to the shape of an extrapolation reference area of a specific one of the extrapolation-reconstructed blocks corresponding to the extrapolation reference candidate. The extrapolation reference area may also be determined based on the extrapolation reference area type of the specific extrapolation-reconstructed block corresponding to the extrapolation reference candidate.

In some implementations, the size of the extrapolation derived area, e.g., the extrapolation reference area and the extrapolation neighboring area, may be determined only based on the size of the coding block, e.g., the extrapolation-reconstructed blocks and the block unit. Thus, the size of the extrapolation neighboring area of the block unit may be proportional to the size of the extrapolation reference area based on the size relationship between the block unit and the specific extrapolation-reconstructed block corresponding to the extrapolation reference candidate.

When the block unit inherits the extrapolation reference filter shape of the extrapolation reference candidate, the decoder module 124 may determine an extrapolation prediction filter shape of the block unit based on the extrapolation reference filter shape of the extrapolation reference candidate. In some implementations, the extrapolation prediction filter shape of the block unit may be identical to the extrapolation reference filter shape of the extrapolation reference candidate.

The decoder module 124 may derive the extrapolation prediction coefficients of the extrapolation prediction filter based on the extrapolation prediction filter shape and the extrapolation neighboring area of the block unit. In some implementations, the extrapolation prediction coefficients of the extrapolation prediction filter may be derived based on the LDL decomposition. In some implementations, the extrapolation filter coefficients may be derived based on the gaussian elimination. In some implementations, the extrapolation filter coefficients may be derived by the same method in convolutional cross-component model (CCCM) of the video coding standard.

Referring back to FIG. 3, at block 360, the decoder module 124 may reconstruct the block unit based on the extrapolation prediction filter.

With reference to FIGS. 1 and 2, in some implementations, the decoder module 124 may predict the block unit using the extrapolation prediction filter based on the reconstructed neighboring samples to generate a predicted block. Then, the decoder module 124 may determine multiple residual components of a residual block from the bitstream for the block unit and add the residual components into the predicted block to reconstruct the block unit.

In some implementations, an extrapolation merge flag of the block unit may be determined from the bitstream for indicating whether the block unit inherits the extrapolation reference parameters from the extrapolation merge list of the block unit. The extrapolation merge list of the block unit may be constructed when the extrapolation merge flag of the block unit is equal to one. In addition, when the extrapolation merge flag of the block unit is equal to zero, the decoder module 124 may bypass constructing the extrapolation merge list of the block unit and predict the block unit in other decoding schemes. The decoder module 124 may reconstruct all of the other block units in the image frame for reconstructing the image frame and the video. The method/process 300 may then end.

Figure 8:
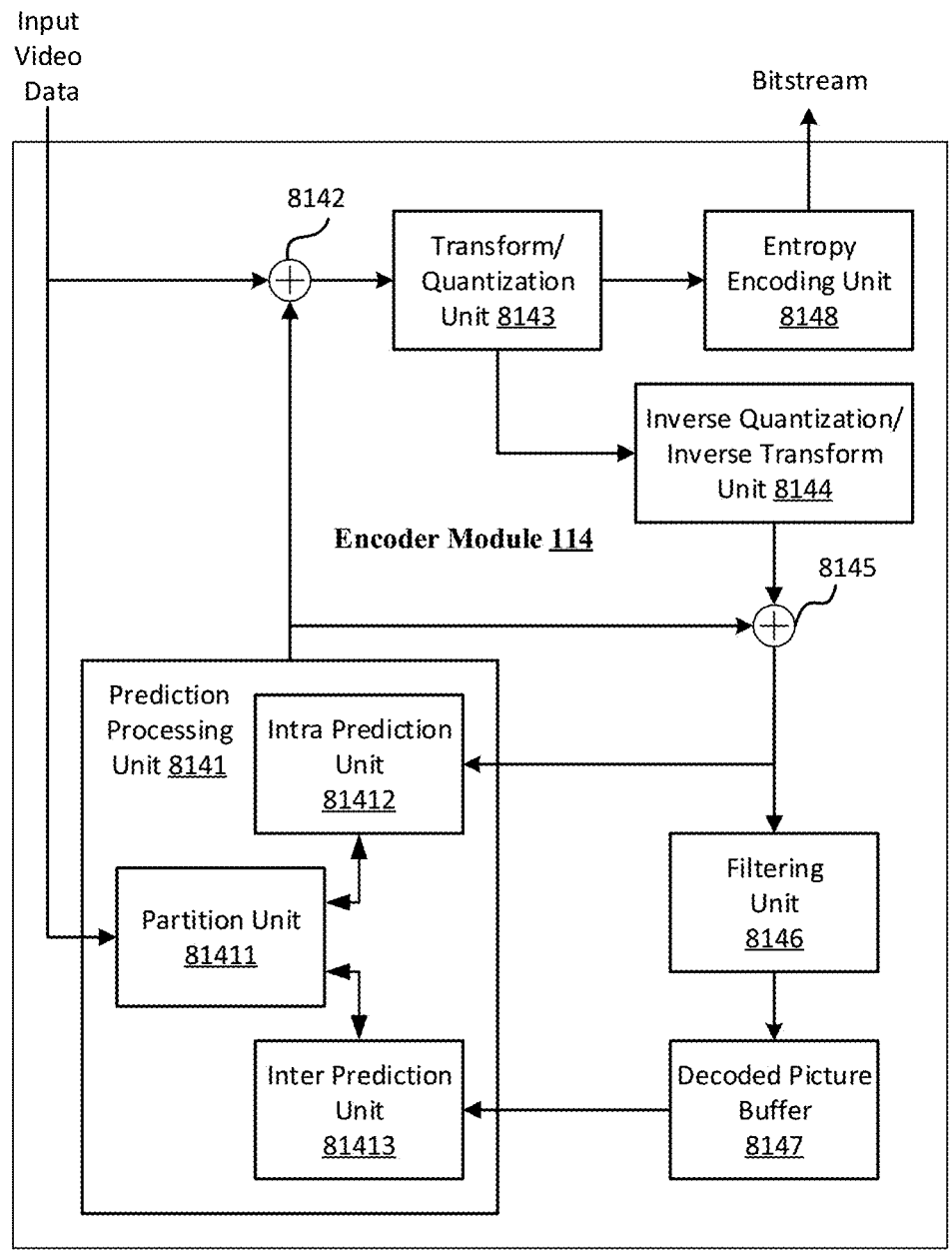
FIG. 8 is a block diagram illustrating an encoder module of the first electronic device illustrated in FIG. 1, in accordance with one or more example implementations of this disclosure.

FIG. 8 is a block diagram illustrating an encoder module 114 of the first electronic device 110 illustrated in FIG. 1, in accordance with one or more example implementations of this disclosure. The encoder module 114 may include a prediction processor (e.g., a prediction processing unit 8141), at least a first summer (e.g., a first summer 8142) and a second summer (e.g., a second summer 8145), a transform/quantization processor (e.g., a transform/quantization unit 8143), an inverse quantization/inverse transform processor (e.g., an inverse quantization/inverse transform unit 8144), a filter (e.g., a filtering unit 8146), a decoded picture buffer (e.g., a decoded picture buffer 8147), and an entropy encoder (e.g., an entropy encoding unit 8148). The prediction processing unit 8141 of the encoder module 114 may further include a partition processor (e.g., a partition unit 81411), an intra prediction processor (e.g., an intra prediction unit 81412), and an inter prediction processor (e.g., an inter prediction unit 81413). The encoder module 114 may receive the source video and encode the source video to output a bitstream.

The encoder module 114 may receive source video including multiple image frames and then divide the image frames according to a coding structure. Each of the image frames may be divided into at least one image block.

The at least one image block may include a luminance block having multiple luminance samples and at least one chrominance block having multiple chrominance samples. The luminance block and the at least one chrominance block may be further divided to generate macroblocks, CTUs, CBs, sub-divisions thereof, and/or other equivalent coding units.

The encoder module 114 may perform additional sub-divisions of the source video. It should be noted that the disclosed implementations are generally applicable to video coding regardless of how the source video is partitioned prior to and/or during the encoding.

During the encoding process, the prediction processing unit 8141 may receive a current image block of a specific one of the image frames. The current image block may be the luminance block or one of the chrominance blocks in the specific image frame.

The partition unit 81411 may divide the current image block into multiple block units. The intra prediction unit 81412 may perform intra-predictive coding of a current block unit relative to one or more neighboring blocks in the same frame, as the current block unit, in order to provide spatial prediction. The inter prediction unit 81413 may perform inter-predictive coding of the current block unit relative to one or more blocks in one or more reference image blocks to provide temporal prediction.

The prediction processing unit 8141 may select one of the coding results generated by the intra prediction unit 81412 and the inter prediction unit 81413 based on a mode selection method, such as a cost function. The mode selection method may be a rate-distortion optimization (RDO) process.

The prediction processing unit 8141 may determine the selected coding result and provide a predicted block corresponding to the selected coding result to the first summer 8142 for generating a residual block and to the second summer 8145 for reconstructing the encoded block unit. The prediction processing unit 8141 may further provide syntax elements, such as motion vectors, intra-mode indicators, partition information, and/or other syntax information, to the entropy encoding unit 8148.

The intra prediction unit 81412 may intra-predict the current block unit. The intra prediction unit 81412 may determine an intra prediction mode directed toward a reconstructed sample neighboring the current block unit in order to encode the current block unit.

The intra prediction unit 81412 may encode the current block unit using various intra prediction modes. The intra prediction unit 81412 of the prediction processing unit 8141 may select an appropriate intra prediction mode from the selected modes. The intra prediction unit 81412 may encode the current block unit using a cross-component prediction mode to predict one of the two chroma components of the current block unit based on the luma components of the current block unit. The intra prediction unit 81412 may predict a first one of the two chroma components of the current block unit based on the second of the two chroma components of the current block unit.

The inter prediction unit 81413 may inter-predict the current block unit as an alternative to the intra prediction performed by the intra prediction unit 81412. The inter prediction unit 81413 may perform motion estimation to estimate motion of the current block unit for generating a motion vector.

The motion vector may indicate a displacement of the current block unit within the current image block relative to a reference block unit within a reference image block. The inter prediction unit 81413 may receive at least one reference image block stored in the decoded picture buffer 8147 and estimate the motion based on the received reference image blocks to generate the motion vector.

The first summer 8142 may generate the residual block by subtracting the prediction block determined by the prediction processing unit 8141 from the original current block unit. The first summer 8142 may represent the component or components that perform this subtraction.

The transform/quantization unit 8143 may apply a transform to the residual block in order to generate a residual transform coefficient and then quantize the residual transform coefficients to further reduce the bit rate. The transform may be one of a DCT, DST, AMT, MDNSST, HyGT, signal-dependent transform, KLT, wavelet transform, integer transform, sub-band transform, and a conceptually similar transform.

The transform may convert the residual information from a pixel value domain to a transform domain, such as a frequency domain. The degree of quantization may be modified by adjusting a quantization parameter.

The transform/quantization unit 8143 may perform a scan of the matrix including the quantized transform coefficients. Alternatively, the entropy encoding unit 8148 may perform the scan.

The entropy encoding unit 8148 may receive multiple syntax elements from the prediction processing unit 8141 and the transform/quantization unit 8143, including a quantization parameter, transform data, motion vectors, intra modes, partition information, and/or other syntax information. The entropy encoding unit 8148 may encode the syntax elements into the bitstream.

The entropy encoding unit 8148 may entropy encode the quantized transform coefficients by performing CAVLC, CABAC, SBAC, PIPE coding, or another entropy coding technique to generate an encoded bitstream. The encoded bitstream may be transmitted to another device (e.g., the second electronic device 120, as shown in FIG. 1) or archived for later transmission or retrieval.

The inverse quantization/inverse transform unit 8144 may apply inverse quantization and inverse transformation to reconstruct the residual block in the pixel domain for later use as a reference block. The second summer 8145 may add the reconstructed residual block to the prediction block provided by the prediction processing unit 8141 in order to produce a reconstructed block for storage in the decoded picture buffer 8147.

The filtering unit 8146 may include a deblocking filter, an SAO filter, a bilateral filter, and/or an ALF to remove blocking artifacts from the reconstructed block. Other filters (in loop or post loop) may be used in addition to the deblocking filter, the SAO filter, the bilateral filter, and the ALF. Such filters are not illustrated for brevity and may filter the output of the second summer 8145.

The decoded picture buffer 8147 may be a reference picture memory that stores the reference block to be used by the encoder module 814 to encode video, such as in intra-coding or inter-coding modes. The decoded picture buffer 8147 may include a variety of memory devices, such as DRAM (e.g., including SDRAM), MRAM, RRAM, or other types of memory devices. The decoded picture buffer 8147 may be on-chip with other components of the encoder module 114 or off-chip relative to those components.

The method/process 300 for decoding and/or encoding video data may be performed by the first electronic device 110. With reference to FIGS. 1 and 8, at block 310, the method/process 300 may start by the encoder module 114 receiving the video data. The video data received by the encoder module 114 may be a video. At block 320, the encoder module 114 may determine a block unit from a current frame included in the video data. In some implementations, the encoder module 114 may divide the current frame to generate multiple CTUs, and further divide a current CTU included in the CTUs to generate multiple divided blocks and to determine the block unit from the divided blocks, according to the partition indications (e.g., based on any video coding standard). In some other implementations, the encoder module 114 may divide the current frame to generate multiple slices, and further divide a current slice included in the slices to generate multiple CTUs. In addition, the encoder module 114 may further divide a current CTU included in the CTUs to generate multiple divided blocks and to determine the block unit from the divided blocks, according to the partition indications.

At block 330, the encoder module 114 may determine an extrapolation merge list of the block unit including multiple extrapolation merge candidates. With reference to FIGS. 1 and 8, the extrapolation merge candidates in the extrapolation merge list, determined by the encoder module 114, may be identical to the extrapolation merge candidates in the extrapolation merge list, determined by the decoder module 124. Thus, the extrapolation merge list, determined by the encoder module 114, may be identical to the extrapolation merge list, determined by the decoder module 124.

Each of the extrapolation merge candidates includes multiple previous extrapolation parameters used to reconstruct a corresponding one of multiple extrapolation-reconstructed blocks. The previous extrapolation parameters in one of the extrapolation merge candidates may include a previous extrapolation filter shape of a corresponding extrapolation candidate filter. In some implementations, the previous extrapolation parameters in one of the extrapolation merge candidates may include a previous extrapolation filter shape and multiple previous extrapolation coefficients of a corresponding extrapolation candidate filter. In some other implementations, the previous extrapolation parameters in one of the extrapolation merge candidates may include a previous extrapolation filter shape of a corresponding extrapolation candidate filter and a previous extrapolation area type of the one of the extrapolation merge candidates. In some implementations, the previous extrapolation parameters in each of the extrapolation merge candidates, determined by the encoder module 114, may be identical to the previous extrapolation parameters in each of the extrapolation merge candidates, determined by the decoder module 124.

At block 340, the encoder module 114 may select an extrapolation reference candidate from the extrapolation merge candidates for the block unit.

With reference to FIGS. 1 and 8, in some implementations, the encoder module 114 may determine an arrangement of the extrapolation merge candidates based on multiple template cost values, and select all or a portion of the extrapolation merge candidates based on the determined arrangement of the extrapolation merge candidates to generate an extrapolation reordered list. Then, the encoder module 114 may select each of the extrapolation merge candidates in the extrapolation reordered list as multiple extrapolation reference candidates for predicting the block unit at the following block of the method/process 300. The template cost values of the extrapolation merge candidates, determined by the encoder module 114, may be identical to those, determined by the decoder module 124. The arrangement of the extrapolation merge candidates determined by the encoder module 114 may be identical to that, determined by the decoder module 124. In addition, the extrapolation reordered list, determined by the encoder module 114, may be identical to that, determined by the decoder module 124.

In some other implementations, the encoder module 114 may directly select each of the extrapolation merge candidates in the extrapolation merge list as the extrapolation reference candidates for predicting the block unit. In other words, the encoder module 114 may predict the block unit using each of the extrapolation merge candidates at the following block of the method/process 300, without calculating the template cost values and generating the extrapolation reordered list.

At block 350, the encoder module 114 may determine an extrapolation prediction filter of the block unit based on the extrapolation reference candidate.

With reference to FIGS. 1 and 8, in some implementations, the encoder module 114 may determine multiple extrapolation prediction filters of the block unit based on the extrapolation reference candidates. Each of the extrapolation prediction filters of the block unit may be determined based on a corresponding one of the extrapolation reference candidates.

Each of the extrapolation merge candidates may include multiple previous extrapolation parameters used to predict a corresponding one of multiple extrapolation-reconstructed blocks. The previous extrapolation parameters in each of the extrapolation merge candidates, determined by the encoder module 114, may be identical to those, determined by the decoder module 124. In the encoder module 114, the extrapolation reference candidates may be selected from the extrapolation merge candidates. Thus, multiple extrapolation reference parameters in each of the extrapolation reference candidates, determined by the encoder module 114, may also be used to predict the corresponding extrapolation-reconstructed block. In addition, the extrapolation reference parameters in each of the extrapolation reference candidates, determined by the encoder module 114, may be identical to the previous extrapolation parameters in a corresponding one of the extrapolation merge candidates, determined by the decoder module 124.

In some implementations, the extrapolation reference parameters in one of the extrapolation reference candidates may include an extrapolation reference filter shape of a corresponding one of multiple extrapolation reference filters. Each of the extrapolation reference filters may be used to predict one of the extrapolation-reconstructed blocks corresponding to one of the extrapolation reference candidates.

In some implementations, the extrapolation reference parameters in one of the extrapolation reference candidates may include the extrapolation reference filter shape and multiple extrapolation reference coefficients of the corresponding extrapolation candidate filter. Thus, the encoder module 114 may determine a corresponding one of the extrapolation prediction filters directly based on the extrapolation reference filter shape and the extrapolation reference coefficients of the corresponding extrapolation candidate filter. The extrapolation reference filter shape and the extrapolation reference coefficients of the corresponding extrapolation candidate filter may be directly regarded as an extrapolation prediction filter shape and multiple extrapolation prediction coefficients of the block unit, corresponding to the one of the extrapolation reference candidates.

In some other implementations, the extrapolation reference parameters in one of the extrapolation reference candidates may include the extrapolation reference filter shape of the corresponding extrapolation candidate filter and an extrapolation reference area type of the one of the extrapolation reference candidates. The extrapolation reference area type and the extrapolation reference filter shape corresponding to the extrapolation reference candidates may be regarded as an extrapolation prediction area type and an extrapolation prediction filter shape of the block unit, corresponding to the one of the extrapolation reference candidates. The extrapolation prediction area type corresponding to the one of the extrapolation reference candidates may be used to determine one of multiple extrapolation neighboring areas corresponding to the one of the extrapolation reference candidates. Thus, the encoder module 114 may derive a corresponding one of the extrapolation prediction filters based on the extrapolation prediction filter shape and the extrapolation neighboring area corresponding to the one of the extrapolation reference candidates.

In some implementations, the extrapolation prediction coefficients of the extrapolation prediction filter may be derived based on the LDL decomposition. In some other implementations, the extrapolation filter coefficients may be derived based on the gaussian elimination. In yet some other implementations, the extrapolation filter coefficients may be derived by the same method in convolutional cross-component model (CCCM) of the video coding standard.

Referring back to FIG. 3, at block 360, the encoder module 124 may reconstruct the block unit based on the extrapolation prediction filter.

With reference to FIGS. 1 and 8, the encoder module 114 may predict the block unit based on each of the extrapolation prediction filters to generate multiple predicted blocks. In addition, the encoder module 114 may predict the block unit based on other prediction modes to generate multiple prediction blocks. The encoder module 114 may select one of the predicted blocks and the prediction blocks based on a mode selection method, such as a cost function. The mode selection method may be an RDO process, a Sum of Absolute Difference (SAD) process, a Sum of Absolute Transformed Difference (SATD) process, a Mean Absolute Difference (MAD) process, a Mean Squared Difference (MSD) process, and a Structural SIMilarity (SSIM) process. The encoder module 114 may provide the selected coding result to the first summer 8142 for generating a residual block and to the second summer 8145 for reconstructing the encoded block unit. The reconstruction of the block unit by the encoder module 114 may be identical to the reconstruction of the block unit by the decoder module 124.

In some implementations, when one of the predicted blocks corresponding to one of the extrapolation prediction filters is selected to predict and reconstruct the block unit, the encoder module 114 may further provide syntax elements, such as an extrapolation merge index and an extrapolation merge flag, included in the bitstream for transmitting to the decoder module 124. In some implementations, the extrapolation merge index of the block unit may be used to determine one of the extrapolation merge candidates corresponding to the selected one of the extrapolation prediction filters. In some other implementations, when the selected one of the extrapolation prediction filters corresponds to a first extrapolation merge candidate in the extrapolation reordered list, the extrapolation merge index may be excluded from the bitstream. Thus, the decoder module 124 may directly determine the first extrapolation merge candidate in the extrapolation reordered list as the extrapolation reference candidate without parsing the extrapolation merge index from the bitstream.

In some implementations, the extrapolation merge flag of the block unit may be determined from the bitstream for indicating whether the block unit inherits the previous extrapolation parameters from the extrapolation merge list to predict the block unit. When the extrapolation merge flag of the block unit, provided by the encoder module 114 and received by the decoder module 124, is equal to zero, the decoder module 124 may bypass constructing the extrapolation merge list of the block unit and predict the block unit in other decoding schemes. In addition, when the extrapolation merge flag of the block unit, provided by the encoder module 114 and received by the decoder module 124, is equal to one, the decoder module 124 may determine the extrapolation merge list of the block unit for predicting the block unit.

The encoder module 114 may predict and reconstruct all of the other block units in the image frame for reconstructing the image frame and the video. The method/process 300 for the encoder module 114 may then end.

The disclosed implementations are to be considered in all respects as illustrative and not restrictive. It should also be understood that the present disclosure is not limited to the specific disclosed implementations, but that many rearrangements, modifications, and substitutions are possible without departing from the scope of the present disclosure.

What is claimed is:

1. A method of decoding video data performed by an electronic device, the method comprising:
receiving the video data;
determining a block unit from a current frame included in the video data;
determining an extrapolation merge list of the block unit, the extrapolation merge list including a plurality of extrapolation merge candidates, wherein each of the plurality of extrapolation merge candidates includes a plurality of previous extrapolation parameters used to reconstruct a corresponding one of a plurality of extrapolation-reconstructed blocks;
selecting an extrapolation reference candidate from the plurality of extrapolation merge candidates for the block unit, wherein the extrapolation reference candidate is one of the plurality of extrapolation merge candidates;
determining an extrapolation prediction filter of the block unit based on the extrapolation reference candidate; and
reconstructing the block unit based on the extrapolation prediction filter.

2. The method according to claim 1, wherein:
each of the plurality of extrapolation merge candidates of the block unit corresponds to one of a plurality of extrapolation candidate filters, and
determining the extrapolation prediction filter of the block unit is further based on an extrapolation reference filter that is determined from the plurality of extrapolation candidate filters and that corresponds to the extrapolation reference candidate.

3. The method according to claim 2, wherein:
a specific one of the plurality of extrapolation-reconstructed blocks corresponding to the extrapolation reference candidate is reconstructed using the extrapolation reference filter.

4. The method according to claim 2, wherein:
the extrapolation prediction filter of the block unit is identical to the extrapolation reference filter when the block unit directly inherits the extrapolation reference filter.

5. The method according to claim 1, further comprising:
determining a plurality of extrapolation reference parameters of the extrapolation reference candidate from the plurality of previous extrapolation parameters, wherein:
the extrapolation reference candidate corresponds to an extrapolation reference filter, and
the plurality of extrapolation reference parameters includes an extrapolation reference filter shape of the extrapolation reference filter.

6. The method according to claim 5, wherein:
the plurality of extrapolation reference parameters further includes a plurality of extrapolation reference coefficients of the extrapolation reference filter, and
determining the extrapolation prediction filter of the block unit is further based on the extrapolation reference filter shape and the plurality of extrapolation reference coefficients of the extrapolation reference filter.

7. The method according to claim 5, wherein:
the plurality of extrapolation reference parameters further includes an extrapolation reference area type of the extrapolation reference candidate, and
determining the extrapolation prediction filter of the block unit is further based on the extrapolation reference area type of the extrapolation reference candidate and the extrapolation reference filter shape of the extrapolation reference filter when the block unit inherits the extrapolation reference area type of the extrapolation reference candidate.

8. The method according to claim 7, further comprising:
determining an extrapolation neighboring area of the block unit neighboring the block unit based on the extrapolation reference area type of the extrapolation reference candidate; and
deriving a plurality of extrapolation prediction coefficients of the extrapolation prediction filter based on the extrapolation reference filter shape of the extrapolation reference filter and the extrapolation neighboring area of the block unit.

9. The method according to claim 8, wherein:
a shape of the extrapolation neighboring area of the block unit is identical to a shape of an extrapolation reference area of a specific one of the plurality of extrapolation-reconstructed blocks corresponding to the extrapolation reference candidate, the extrapolation reference area determined based on the extrapolation reference area type of the extrapolation reference candidate, and
a size of the extrapolation neighboring area of the block unit is proportional to a size of the extrapolation reference area based on a size relationship between the block unit and the specific one of the plurality of extrapolation-reconstructed blocks.

10. The method according to claim 1, further comprising:
determining an extrapolation merge index of the block unit from the video data, wherein selecting the extrapolation reference candidate from the plurality of extrapolation merge candidates for the block unit is further based on the extrapolation merge index of the block unit.

11. The method according to claim 1, further comprising:
determining an extrapolation merge flag of the block unit from the video data for indicating whether the block unit inherits a plurality of extrapolation reference parameters from the extrapolation merge list of the block unit, wherein the extrapolation merge list of the block unit is determined when the extrapolation merge flag of the block unit is equal to one.

12. An electronic device for decoding video data, the electronic device comprising:
at least one processor; and
one or more non-transitory computer-readable media coupled to the at least one processor and storing one or more computer-executable instructions that, when executed by the at least one processor, cause the electronic device to:

receive the video data;

determine a block unit from a current frame included in the video data;

determine an extrapolation merge list of the block unit, the extrapolation merge list including a plurality of extrapolation merge candidates, wherein each of the plurality of extrapolation merge candidates includes a plurality of previous extrapolation parameters used to reconstruct a corresponding one of a plurality of extrapolation-reconstructed blocks;

select an extrapolation reference candidate from the plurality of extrapolation merge candidates for the block unit, wherein the extrapolation reference candidate is one of the plurality of extrapolation merge candidates;

determine an extrapolation prediction filter of the block unit based on the extrapolation reference candidate; and reconstruct the block unit based on the extrapolation prediction filter.

13. The electronic device according to claim 12, wherein: each of the plurality of extrapolation merge candidates of the block unit corresponds to one of a plurality of extrapolation candidate filters, and determining the extrapolation prediction filter of the block unit is further based on an extrapolation reference filter that is determined from the plurality of extrapolation candidate filters and that corresponds to the extrapolation reference candidate.

14. The electronic device according to claim 13, wherein: the extrapolation prediction filter of the block unit is identical to the extrapolation reference filter when the block unit directly inherits the extrapolation reference filter.

15. The electronic device according to claim 12, wherein the one or more computer-executable instructions, when executed by the at least one processor, further cause the electronic device to:

determine a plurality of extrapolation reference parameters of the extrapolation reference candidate from the plurality of previous extrapolation parameters, wherein:
the extrapolation reference candidate corresponds to an extrapolation reference filter, and
the plurality of extrapolation reference parameters includes an extrapolation reference filter shape of the extrapolation reference filter.

16. The electronic device according to claim 15, wherein: the plurality of extrapolation reference parameters further includes a plurality of extrapolation reference coefficients of the extrapolation reference filter, and
determining the extrapolation prediction filter of the block unit is further based on the extrapolation reference filter shape and the plurality of extrapolation reference coefficients of the extrapolation reference filter.

17. The electronic device according to claim 15, wherein: the plurality of extrapolation reference parameters further includes an extrapolation reference area type of the extrapolation reference candidate, and
determining the extrapolation prediction filter of the block unit is further based on the extrapolation reference area type of the extrapolation reference candidate and the extrapolation reference filter shape of the extrapolation reference filter when the block unit inherits the extrapolation reference area type of the extrapolation reference candidate.

18. The electronic device according to claim 17, wherein the one or more computer-executable instructions, when executed by the at least one processor, further cause the electronic device to:

determine an extrapolation neighboring area of the block unit neighboring the block unit based on the extrapolation reference area type of the extrapolation reference candidate; and derive a plurality of extrapolation prediction coefficients of the extrapolation prediction filter based on the extrapolation reference filter shape of the extrapolation reference filter and the extrapolation neighboring area of the block unit.

19. The electronic device according to claim 12, wherein the one or more computer-executable instructions, when executed by the at least one processor, further cause the electronic device to:

determine an extrapolation merge index of the block unit from the video data, wherein selecting the extrapolation reference candidate from the plurality of extrapolation merge candidates for the block unit is further based on the extrapolation merge index of the block unit.

20. The electronic device according to claim 12, wherein the one or more computer-executable instructions, when executed by the at least one processor, further cause the electronic device to:

determine an extrapolation merge flag of the block unit from the video data for indicating whether the block unit inherits a plurality of extrapolation reference parameters from the extrapolation merge list of the block unit, wherein the extrapolation merge list of the block unit is determined when the extrapolation merge flag of the block unit is equal to one.

* * * * *